United States Patent
Jung et al.

(10) Patent No.: US 10,115,973 B2
(45) Date of Patent: *Oct. 30, 2018

(54) COMPOSITION OF A NICKELATE COMPOSITE CATHODE FOR A FUEL CELL

(71) Applicant: LG Fuel Cell Systems Inc., North Canton, OH (US)

(72) Inventors: Hwa Young Jung, Canton, OH (US); Minjae Jung, Stow, OH (US); Zhien Liu, Canton, OH (US); Rich Goettler, Medina, OH (US)

(73) Assignee: LG FUEL CELL SYSTEMS INC., North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,913

(22) Filed: Jun. 7, 2016

(65) Prior Publication Data

US 2017/0125822 A1    May 4, 2017

Related U.S. Application Data

(60) Provisional application No. 62/247,535, filed on Oct. 28, 2015.

(51) Int. Cl.
*H01M 4/90* (2006.01)
*H01M 8/12* (2016.01)
(Continued)

(52) U.S. Cl.
CPC ....... *H01M 4/9033* (2013.01); *H01M 4/8652* (2013.01); *H01M 4/8657* (2013.01);
(Continued)

(58) Field of Classification Search
None
See application file for complete search history.

(56) References Cited

U.S. PATENT DOCUMENTS 6,444,609 B1    9/2002  Golovin
7,572,532 B2    8/2009  Stevens et al.
(Continued)

FOREIGN PATENT DOCUMENTS

JP    2010277877 A  * 12/2010

OTHER PUBLICATIONS

Hiroaki Taguchi, Reiichi Chiba, Takeshi Komatsu, Himeko Orui, Kimitaka Watanabe, Katsuya Hayashi; "LNF SOFC cathodes with active layer using Pr6O11 or Pr-doped CeO2"; Journal of Power Sources 241 (2013) 768e775; Available online May 30, 2013.*

(Continued)

*Primary Examiner* — Barbara L Gilliam
*Assistant Examiner* — Nathanael T Zemui
(74) *Attorney, Agent, or Firm* — Dentons US LLP

(57) ABSTRACT

In some embodiments, a solid oxide fuel cell comprising an anode, an electrolyte, cathode barrier layer, a nickelate composite cathode separated from the electrolyte by the cathode barrier layer, and a cathode current collector layer is provided. The nickelate composite cathode includes a nickelate compound and second oxide material, which may be an ion conductor. The composite may further comprise a third oxide material. The composite may have the general formula $(Ln_uM1_vM2_s)_{n+1}(Ni_{1-t}N_t)_nO_{3n+1}\text{-}A_{1-x}B_xO_y\text{---}C_wD_zCe_{(1-w-z)}O_{2-\delta}$, wherein A and B may be rare earth metals excluding ceria.

5 Claims, 23 Drawing Sheets

(51) Int. Cl.
*H01M 4/86* (2006.01)
*H01M 4/88* (2006.01)
*H01M 8/124* (2016.01)

(52) U.S. Cl.
CPC ....... *H01M 4/8663* (2013.01); *H01M 4/8673* (2013.01); *H01M 4/8817* (2013.01); *H01M 4/9016* (2013.01); *H01M 8/12* (2013.01); *H01M 2004/8689* (2013.01); *H01M 2008/1293* (2013.01)

(56) References Cited

U.S. PATENT DOCUMENTS

| | | | |
|---|---|---|---|
| 2007/0184324 A1* | 8/2007 | Lyons | C04B 35/48 429/486 |
| 2008/0280165 A1 | 11/2008 | Kawamura | |
| 2012/0308915 A1 | 12/2012 | Park et al. | |
| 2016/0020470 A1 | 1/2016 | Jung et al. | |

OTHER PUBLICATIONS

Masatomo Yashima, Nuansaeng Sirikanda, and Tatsumi Ishihara; "Crystal Structure, Diffusion Path, and Oxygen Permeability of a Pr2NiO4-Based Mixed Conductor (Pr0.9La0.1)2(Ni0.74Cu0.21Ga0.05)O4+$\delta$"; J. Am. Chem. Soc. 2010, 132, 2385-2392; Published on Web Feb. 1, 2010.*

Kharton, V.V., et al, "Oxygen Ion Transport in La2Nio4-based Ceramics", Journal of Materials Chemistry, 1999, 9, pp. 2623-2629.

Sadykov, V.A., "Mechanism of Oxygen Transfer in Layered Lanthanide Nickelates Ln2-xNiO4 + $\delta$ (Ln = La, Pr) and Their Nanocomposites with Ce0.9Gd0.1O2—$\delta$ and Y2(Ti0.8Zr 0.2)1.6Mn0.4O7-$\delta$ Solid Electrolytes", Russian Journal of Electrrochemistry, 2013, vol. 49 No. 7, pp. 645-651.

Kharton V.V. et al., "Ionic Transport in Oxygen-Hyperstoichiometric Phases with K2NiF4-type Structure", Solid State Ionics 143, (2001), pp. 337-353.

Kharton V.V. et al., "Surface-Limited Oxygen Transport and Electrode Properties of La2Nio4 Cu0.2O4+$\delta$", Solid State Ionics 166, (2004), pp. 327-337.

Ferchaud C. et al., "High Performance Praseodymium Nickelate Oxide Cathode for Low Temperature Solid Oxide Fuel Cell", Journal of Power Sources 196, (2011) pp. 1872-1879.

Sadykov V. et al., "Oxygen Mobility and Surface Reactivity of PrNi1—xCoxO3+$\delta$-Ce0.9Y0.1O2—$\delta$ Cathode Nanocomposites", Solid State Ionics 262 (2014), pp. 707-712.

Sayers R. et al., "In-situ Compatibility Studies of Lanthanum Nickelate with a Ceria-based Electrolyte for SOFC Composite Cathodes", Imperial College, Journal of Materials Chemistry, Issue 8, 2012, pp. 1-31.

Skinner S.J. et al., "Oxygen Ion Conductors", Materials Today (Review Feature), Mar. 2003, pp. 30-37.

International Searching Authority, International Search Report for corresponding International Application No. PCT/US17/36161, dated Aug. 11, 2017, 2pgs.

* cited by examiner

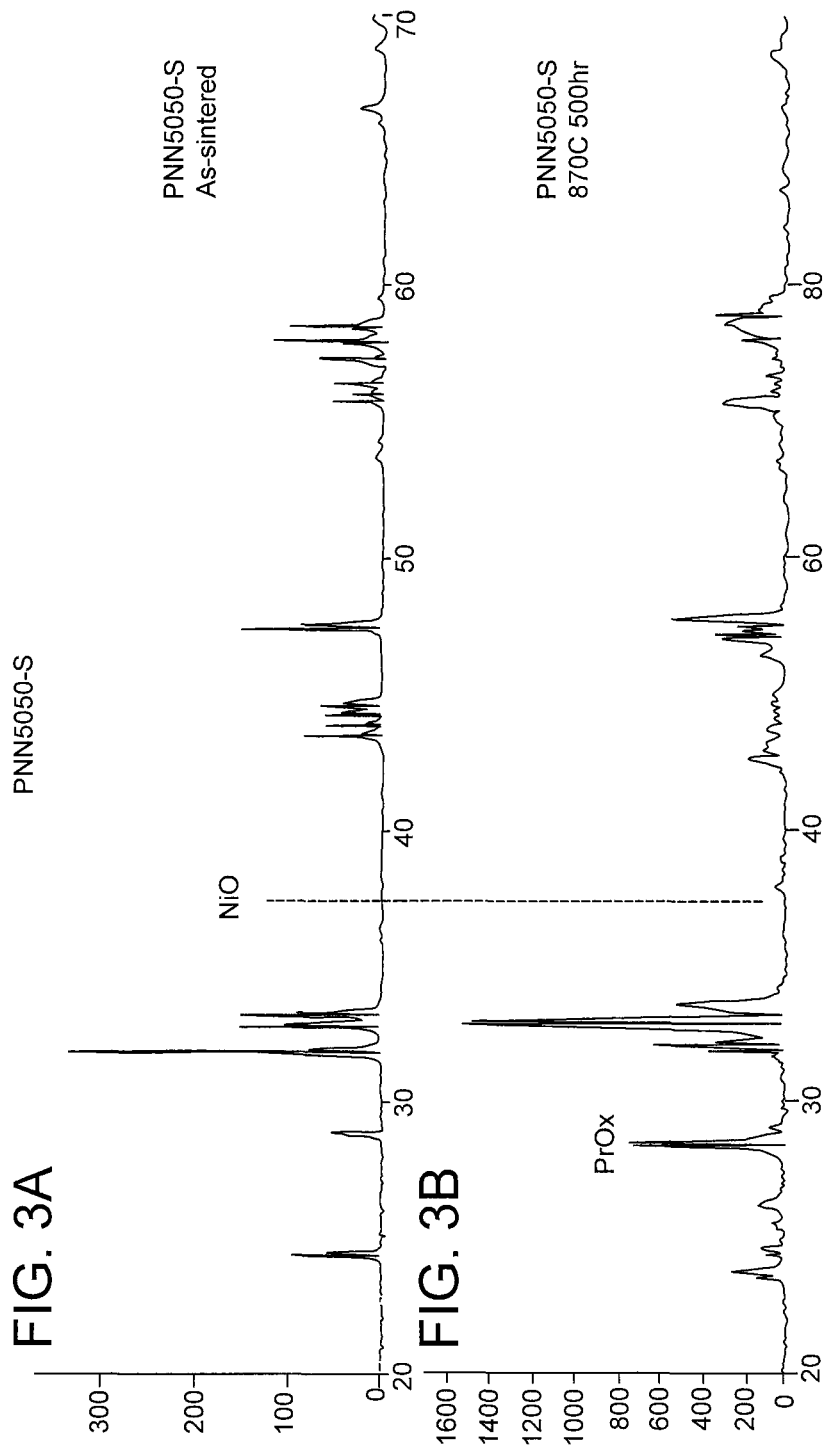

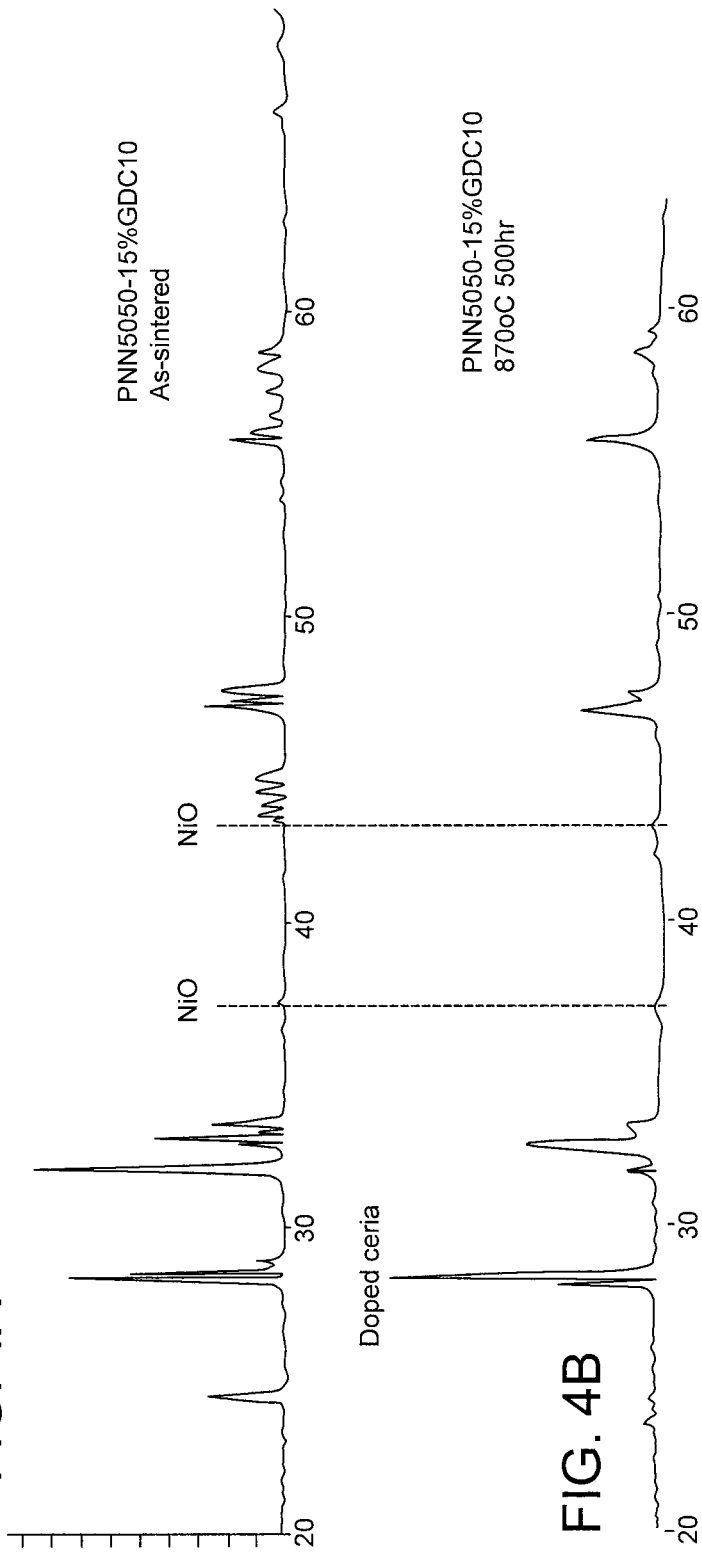

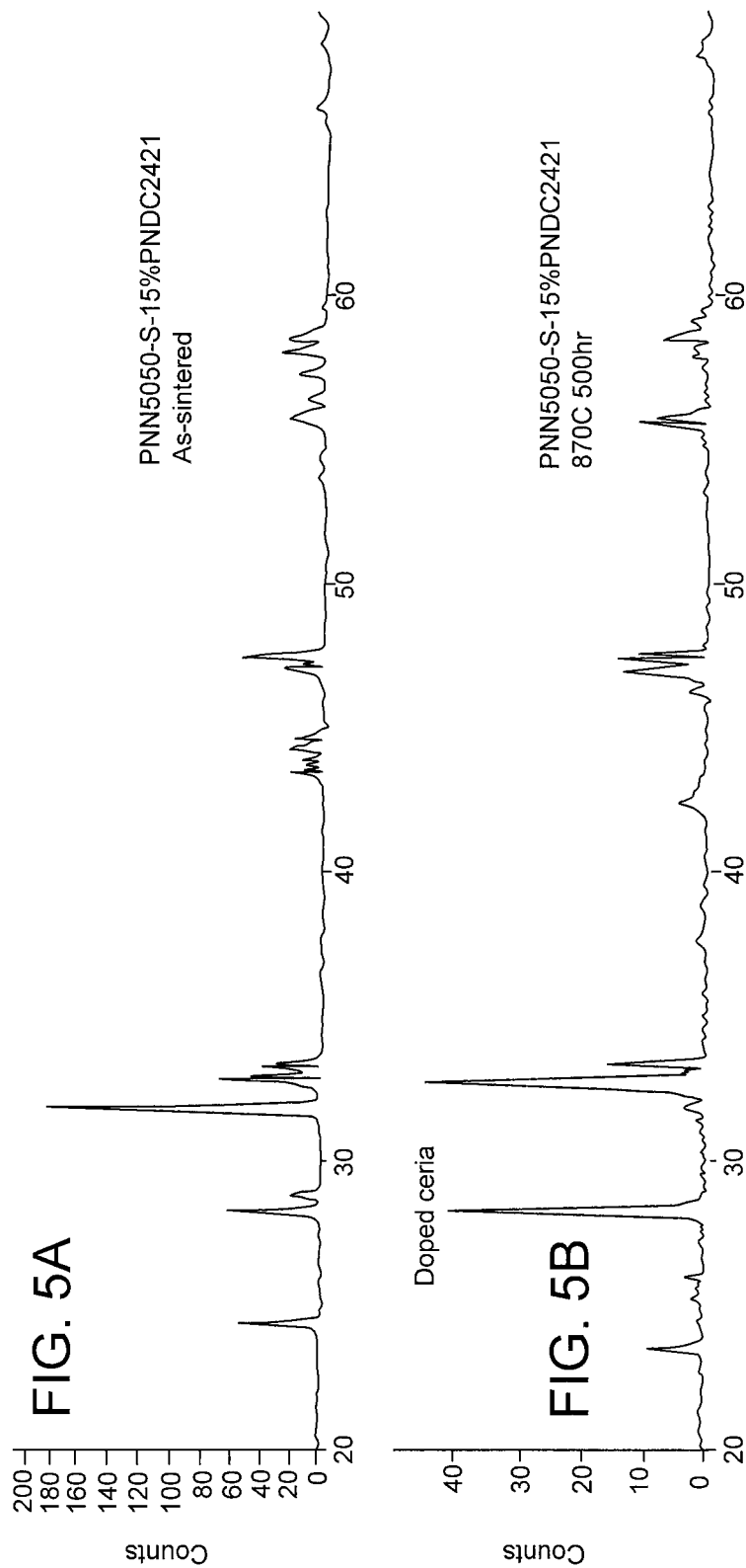

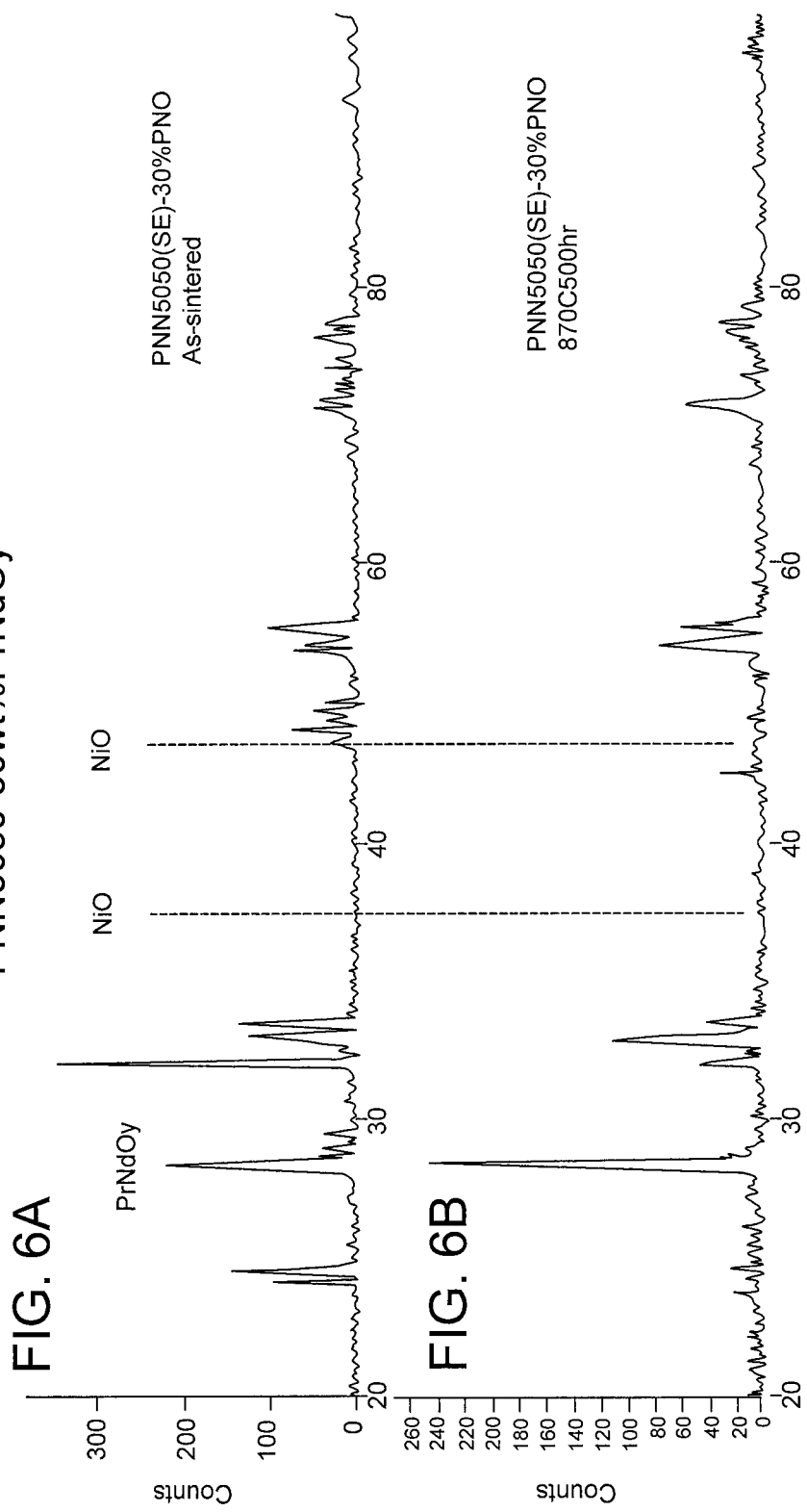

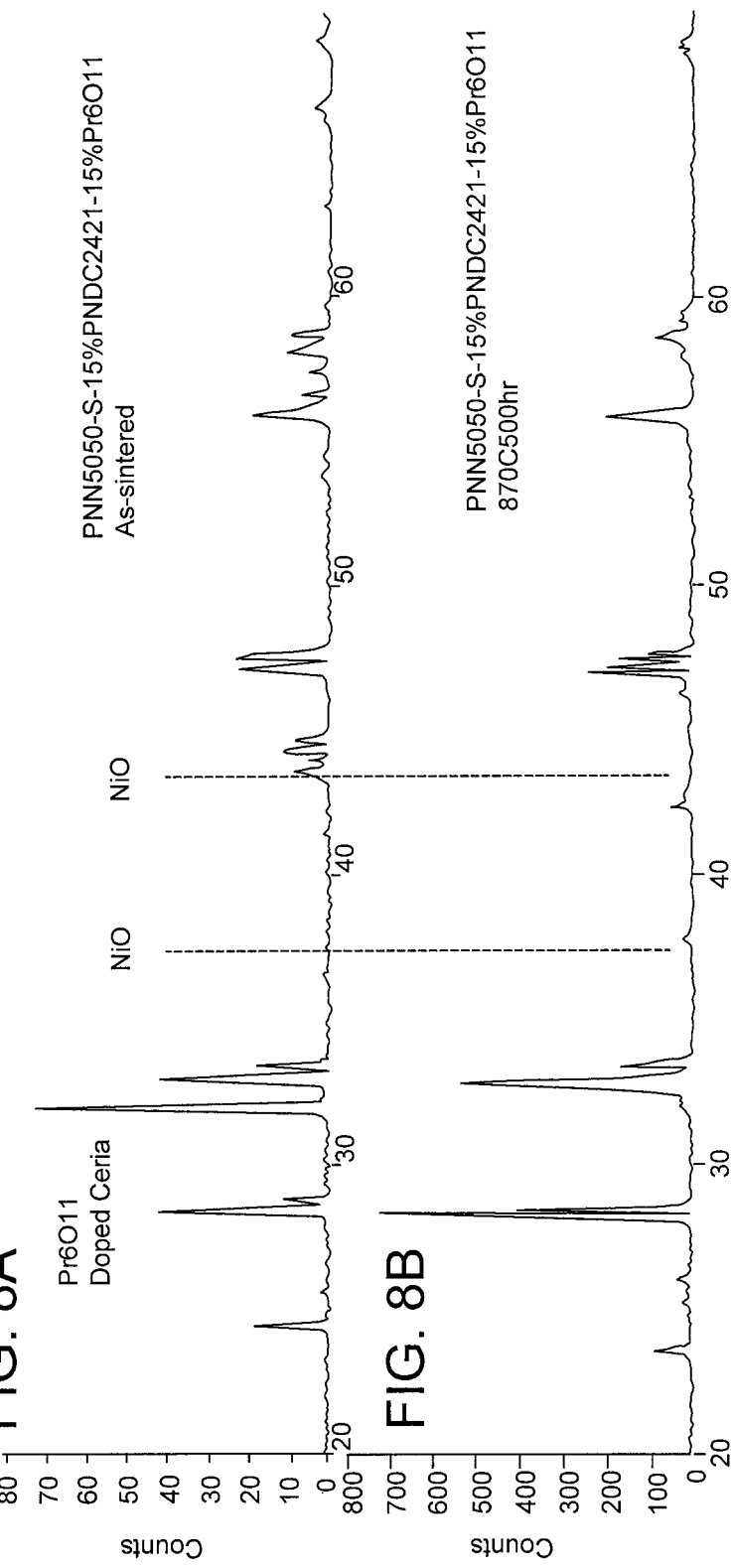

COMPOSITION OF A NICKELATE COMPOSITE CATHODE FOR A FUEL CELL

CROSS REFERENCE TO RELATED APPLICATIONS

This Application claims priority to U.S. Prov. Pat. App. No. 62/247,535, filed Oct. 28, 2015, herein incorporated by reference in its entirety for all purposes.

GOVERNMENT RIGHTS

This invention was made with U.S. Government support under Assistance Agreement Nos. DE-FE0000303 and DE-FE0012077 awarded by the Department of Energy. The Government may have certain rights in this invention.

TECHNICAL FIELD

The disclosure generally relates to fuel cells, such as solid oxide fuel cells.

BACKGROUND

Fuel cells, fuel cell systems and interconnects for fuel cells and fuel cell systems remain an area of interest. Some existing systems have various shortcomings, drawbacks, and disadvantages relative to certain applications. Accordingly, there remains a need for further contributions in this area of technology.

A solid oxide fuel cell may be an electrochemical system configured to convert fuel (e.g., hydrogen) to electricity at relatively high temperatures (e.g., greater than about 500 degrees Celsius). In some examples, lower power degradation rate and lower cost can be achieved when operating these systems at lower temperatures. However, polarization of the cathode of the fuel cell may be relatively high at lower temperatures, which can affect system performance.

In some examples, cathodes may be formed of lanthanide nickelate having the general formula $Ln_2NiO_{4+\delta}$. Lanthanide nickelates may have a layered structure with alternating layers of perovskites and sodium chloride type layers. The interstitial oxide-ions are accommodated by the mismatch of the equilibrium (Ln-O) and (M-O) bond lengths where the structural tolerance factor t is less than 1. This highly mobile $O^{2-}$ exhibits a good ionic conductivity. Moreover, in this structure, the Ni (III)/Ni (II) redox couples are pinned at the top of the $O^{2-}: 2p^6$ bands to give an acceptably high electronic conductivity in the mixed-valence state. Due to its unique structure, lanthanide nickelate cathodes may have lower activation energy than other cathode materials being used for solid oxide fuel cells, such as LSM and LSCF. Further, lanthanide nickelate cathode polarization resistance may be less dependent on temperature change than other materials. Therefore, this material may maintain lower ASR at lower operating temperatures. Especially low ASR has been demonstrated from praseodymium nickelate cathode. However, one issue is that nickelate materials can be unstable under fuel cell operating temperatures, such as between about 700 to about 900 degrees Celsius. For example, under fuel cell operating conditions, the favorable phase of the nickelate cathode tends to decompose into undesired phases, which causes fuel cell performance degradation.

Due to its lower ASR, especially at lower temperatures, nickelate cathodes continue to be of interest in the field of fuel cells. In some examples, A-site doping, such as Sr or Ca, and B-site doping, such as Cu, Co, Fe, etc., may be employed in an attempt to stabilize nickelate phase. However, such attempts have achieved limited success and/or other issues were present, such as higher coefficient of thermal expansion (CTE) of the cathodes, resulting in a mismatch with other fuel cell materials or substrate.

Analysis has indicated that nickelate decomposition initiated from element exsolution from the A-site of a doped nickelate, such as Pr exsolution from $Pr_2NiO_4$, may result in the formation of oxide. When too much A site element exsolutes form nickelate, Ni may become rich on the B-site, and eventually exsolutes from B-site to form NiO. Analysis also indicates that exsoluted A-site element tends to diffuse into a cathode interlayer made from doped ceria on top of a stabilized zirconia electrolyte.

SUMMARY

Example compositions for cathodes of fuels cells, such as, e.g., solid oxide fuels cells, are described. For example, electrochemical fuel cells including cathodes formed of a nickelate composite material are described. The nickelate composite material of the cathode may include a nickelate compound and an ionic conductive material. The ionic conductive material may be co-doped ceria. The composition of the nickelate composite cathode may allow for improved long term durability and high performance of the cathode and fuel cell under fuel cell operating conditions, for example, as compared to only a nickelate compound. For example, the nickelate compounds of the nickelate composite cathode material may exhibit relatively low area specific resistance (ASR) and better performance, e.g., as compared to other nickelate compounds. The co-doped ceria of the nickelate composite cathode material may be selected to manage material interdiffusion within the cathode and increase the phase stability of the nickelate to increase long term durability of the cathode and fuel cell, e.g., by allowing for exsoluted elements from the A-site and/or B-site of the nickelate compound to diffuse into the ionic phase rather than forming an oxide from the exsolute. In some examples, Ni on the B-site may not diffuse into the ionic phase (e.g., the Ni on the B-site may be exsoluted and not diffused into the ionic phase). The fuel cell may also include a cathode barrier layer separating the cathode from an electrolyte in the fuel cell. The cathode barrier layer may be formed of a co-doped ceria and may be configured to manage material diffusion (e.g., out of the cathode) and increase cathode phase stability.

In one example, the disclosure relates to a fuel cell comprising an anode; an electrolyte; cathode barrier layer; and a nickelate composite cathode separated from the electrolyte by the cathode barrier layer; and a cathode current collector layer. The nickelate composite cathode includes a nickelate compound and an ionic conductive material, and the nickelate compound comprises at least one of $Pr_2NiO_4$, $Nd_2NiO_4$, $(Pr_uNd_v)_2NiO_4$, $(Pr_uNd_v)_3Ni_2O_7$, $(Pr_uNd_v)_4Ni_3O_{10}$, or $(Pr_uNd_vM_w)_2NiO_4$, where M is an alkaline earth metal doped on an A-site of Pr and Nd. The ionic conductive material comprises a first co-doped ceria with a general formula of $(A_xB_y)Ce_{1-x-y}O_2$, where A and B of the first co-doped ceria are rare earth metals. The cathode barrier layer comprises a second co-doped ceria with a general formula $(A_xB_y)Ce_{1-x-y}O_2$, where at least one of A or B of the second co-doped ceria is Pr or Nd. The anode, cathode barrier layer, nickelate composite cathode, cathode current collector layer, and electrolyte are configured to form an electrochemical cell.

In accordance with some embodiments of the present disclosure, a cathode composition comprising nickelate materials and a second oxide material, (A1-xBx)Oy, is provided. IN some embodiments nickelate materials and a second oxide material (A1-xBx)Oy and a Ceria oxide material $C_wD_zCe_{(1-w-z)}O_{2-\delta}$, which A and B are rare earth element except for Ce element, C and D is rate earth element is provided.

In accordance with some embodiments of the present disclosure, a method of inhibiting the formation of a lanthanide oxide phase by forming the cathode from a composition comprising a lanthanide nickelate and a second oxide material which adsorbs an oxide formed from the lanthanide us provided. The second oxide material may comprise rare earth metals and have a general formula of A(1-x)BxOy, wherein element A and element B are different rare earth metals excluding cerium. In some embodiments the second oxide material may comprise rare earth metals and have a general formula of (CwDz)Ce(1-w-z)O2, wherein element C and element D are different rare earth metals excluding cerium, and the composition may further comprise a third oxide material of rare earth metals with a general formula of A(1-x)BxOy, wherein element A and element B are different rare earth metals excluding cerium.

In accordance with some embodiments of the present disclosure, a fuel cell is provided. The fuel cell may comprise an anode, an electrolyte, a cathode, and a cathode current collector. The cathode may comprise a nickelate composite having the general formula $(Ln_uM1_vM2_s)_{n+1}(Ni_{1-t}N_t)_nO_{3n+1}A_{1-x}B_xO_y$—$C_wD_zCe_{(1-w-z)}O_{2-\delta}$ wherein element Ln is a rare earth metal, $0<u\le1$, element M1 is a rare earth metal different from element Ln, $0\le v\le1$, element M2 is an alkaline earth metal, $0\le s\le0.3$, $0.9\le u+v+s<1.1$, $1\le n$, element N is one or more transition metals, $0\le t\le0.5$, element A is a rare earth metal excluding cerium, element B is a rare earth metal different from element A excluding cerium, $0\le x<1$, $1.5\le y\le2.0$, element C is a rare earth metal, $0<w\le0.75$, element D is a rare earth metal different from element C, $0\le z\le0.75$, and $0\le\delta\le0.5$. The fuel cell may further comprise a cathode barrier which is disposed between the cathode and the electrolyte, wherein the cathode barrier comprises a co-doped ceria with a general formula $C_wD_zCe_{(1-w-z)}O_{2-\delta}$ wherein element C is a rare earth metal, $0<w\le0.75$, element D is a rare earth metal different from element C, $0<z\le0.75$, and $0\le\delta\le0.5$.

In accordance with some embodiments of the present disclosure a fuel cell is provided. The fuel cell may comprise an anode, an electrolyte, a cathode, and a cathode current collector, wherein said cathode comprises a nickelate composite having the general formula $(Ln_uM1_vM2_s)_{n+1}(Ni_{1-t}N_t)_nO_{3n+1}$-$A_{1-x}B_xO_y$, wherein, element Ln is a rare earth metal, $0<u\le1$, element M1 is a rare earth metal different from element Ln, $0\le v\le1$, element M2 is an alkaline earth metal, $0\le s\le0.3$, $0.9\le u+v+s<1.1$, $1\le n$, element N is one or more transition metals $0\le t\le0.5$, element A is a rare earth metal excluding cerium, element B is a rare earth metal different from element A excluding cerium, $0\le x<1$, and $1.5\le y\le2.0$. The fuel cell may further comprise a cathode barrier disposed between the cathode and the electrolyte, wherein said cathode barrier comprises a co-doped ceria with a general formula $C_wD_zCe_{1-w-z}O_{2-\delta}$ wherein, element C is a rare earth metal, $0<w\le0.75$, element D is a rare earth metal different from element C, $0<z\le0.75$, and $0\le\delta\le0.5$.

In accordance with some embodiments of the present disclosure, a fuel cell having a nickelate cathode is provided. The fuel cell may comprise an anode, an electrolyte, a cathode, and a cathode current collector. The cathode may comprise a nickelate composite having the general formula $(Ln_uM1_vM2_s)_{n+1}(Ni_{1-t}N_t)_nO_{n+1}$—$C_wD_zCe_{(1-w-z)}O_{2-\delta}$, wherein element Ln is a rare earth metal, $0<u\le1$, element M1 is a rare earth metal different from element Ln, $0\le v\le1$, element M2 is an alkaline earth metal, $0\le s\le0.3$, $0.9\le u+v+s<1.1$, $1\le n$, element N is one or more transition metals, $0\le t\le0.5$, element C is a rare earth metal, $0<w\le0.75$, element D is a rare earth metal different from element C, $0<z\le0.75$, and $0\le\delta\le0.5$. The fuel cell may further comprise a cathode barrier disposed between the cathode and the electrolyte.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

The description herein makes reference to the accompanying drawings wherein like reference numerals refer to like parts throughout the several views.

FIGS. 3A and 3B are plots illustrating XRD results for an example nickelate cathode composition before and after aging, respectively.

FIGS. 4A and 4B are plots illustrating XRD results for an example nickelate composite cathode composition before and after aging, respectively.

FIGS. 5A and 5B are plots illustrating XRD results for another example nickelate composite cathode composition before and after aging, respectively.

FIGS. 6A and 6B are plots illustrating XRD results for another example nickelate composite cathode composition before and after aging, respectively.

FIGS. 8A and 8B are plots illustrating XRD results for another example nickelate composite cathode composition before and after aging, respectively.

Figure 1:
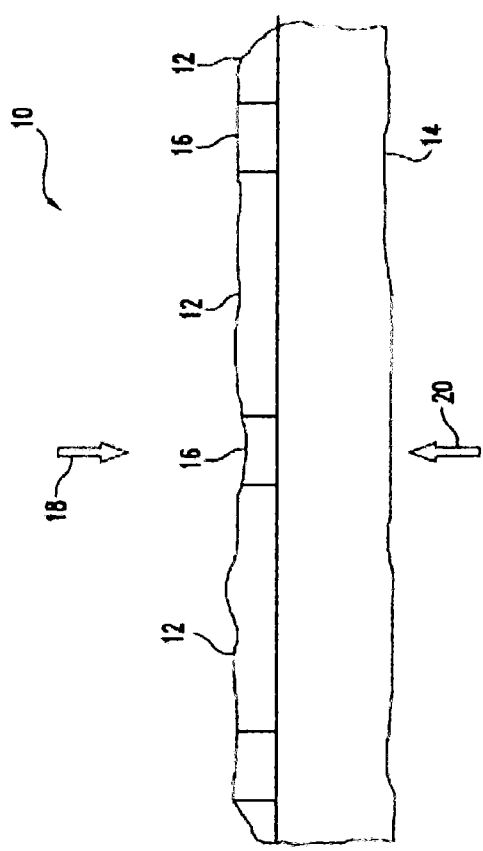
FIG. 1 is a schematic diagram illustrating an example fuel cell system in accordance with an embodiment of the present disclosure.

Referring to the drawings, some aspects of a non-limiting example of a fuel cell system in accordance with an embodiment of the present disclosure is schematically depicted. In the drawing, various features, components and interrelationships therebetween of aspects of an embodiment of the present disclosure are depicted. However, the present disclosure is not limited to the particular embodiments presented and the components, features and interrelationships therebetween as are illustrated in the drawings and described herein.

DETAILED DESCRIPTION

In accordance with some aspects of the disclosure, one or more techniques may be used to manage phase composition of a nickelate cathode to maintain favorable phases during fuel cell operation, to achieve relatively fine microstructure for higher triple phase boundary (i.e., increased site reaction density) and stronger cathode-interlayer (which may also be referred to as a barrier) later bonding through addition of an ionic phase, a second oxide material, a second and third oxide material, or an ionic phase and a second or a second and a third oxide material into the nickelate cathode. For example, as will be described below, the composition of the ionic phase, the second oxide material, the second and third oxide materials, or the ionic phase and the second or the second and the third oxide material may be varied based on nickelate cathode composition to manage element diffusion (e.g., minimize material diffusion) to maintain favorable phases during fuel cell operation. Furthermore, the particular nickelate compositions of the cathode disclosed herein may exhibit lower ASR and/or better performance compared to other nickelates, such as, e.g., cathodes comprising a lanthanide nickelate having the general formula $Ln_2NiO_{4+\delta}$. Additionally, examples of the disclosure may also include a cathode barrier layer separating the nickelate composite cathode from an electrolyte in the fuel cell. The cathode barrier layer may be formed of a co-doped ceria and may be configured to manage material diffusion (e.g., out of the cathode) and increase cathode phase stability.

Examples of the disclosure may provide for one or more advantages. In some examples, the nickelate composite cathode materials described herein may be used to improve fuel cell system performance and reduce cost by enabling the fuel cell system to be operated at temperatures lower than the operating temperature(s) of fuel cells using different cathode materials. For example, by using the nickelate composite cathode materials disclosed herein, a fuel cell may be operated at a temperature between about 700 to about 900 degrees Celsius to generate electricity from a fuel source, such as, e.g., hydrogen, natural gas, or syngas fuel, with high performance and long term durability and cost reduction. In some examples during the operation of a fuel cell, the phase composition of nickelate composite cathodes may be managed to maintain one or more favorable phases to improve long term durability of the fuel cell through the addition of an ionic phase, a second oxide material, a second and third oxide material, or an ionic material and a second or a second and third oxide material with different composition. In some examples, the phase composition of nickelate composite cathodes during fuel cell operation may be managed to maintain favorable phase to improve long term durability through the use of a cathode barrier layer with a composition selected based on the composition of the nickelate cathode. Examples of the disclosure may provide for improved nickelate cathode microstructure to increase triple phase boundary for both lower ASR and long term stability through the addition of an ionic phase, a second oxide material, a second and third oxide material, or an ionic material and a second or a second and third oxide material to the nickelate of the cathode. In some examples, the disclosed nickelate composite cathode may retain the low ASR of nickelate cathodes at a lower operating temperature thereby improving system performance and long term durability of the fuel cell, leading to cost reductions. In some examples, the disclosure relates to approaches for improving the bond or attachment of a nickelate cathode with a cathode barrier layer, which may allow for reduced interface polarization, bond strength, improved long term cathode reliability, or any of the above. Multiple electrochemical tests have been performed on example nickelate composite cathodes of this disclosure and the test demonstrated improved long term durability and a reduction in degradation rate. Examples of the disclosure may provide for other additional advantages, such as, e.g., those apparent from the description herein.

FIG. 1 is a schematic diagram illustrating an example fuel cell system 10 in accordance with an embodiment of the present disclosure. As shown in FIG. 1, fuel cell system 10 includes a plurality of electrochemical cells 12 (or "individual fuel cells") formed on substrate 14. Electrochemical cells 12 are coupled together in series by interconnect 16. Fuel cell system 10 is a segmented-in-series arrangement deposited on a flat porous ceramic tube, although it will be understood that the present disclosure is equally applicable to segmented-in-series arrangements on other substrates, such on a circular porous ceramic tube. In various embodiments, fuel cell system 10 may be an integrated planar fuel cell system or a tubular fuel cell system.

Each electrochemical cell 12 includes an oxidant side 18 and a fuel side 20. The oxidant is generally air, but could also be pure oxygen ($O_2$) or other oxidants, e.g., including dilute air for fuel cell systems having air recycle loops, and is supplied to electrochemical cells 12 from oxidant side 18. Substrate 14 may be specifically engineered, e.g., such that the porous ceramic material is stable at fuel cell operation conditions and chemically compatible with other fuel cell materials. In other embodiments, substrate 14 may be a surface-modified material, e.g., a porous ceramic material having a coating or other surface modification, e.g., configured to prevent or reduce interaction between electrochemical cell 12 layers and substrate 14. A fuel, such as a reformed hydrocarbon fuel, e.g., synthesis gas, is supplied to electrochemical cells 12 from fuel side 20 via channels (not shown) in porous substrate 14. Although air and synthesis gas reformed from a hydrocarbon fuel may be employed in some examples, it will be understood that electrochemical cells using other oxidants and fuels may be employed without departing from the scope of the present disclosure, e.g., pure hydrogen and pure oxygen. In addition, although fuel is supplied to electrochemical cells 12 via substrate 14, it will be understood that in other embodiments, the oxidant may be supplied to the electrochemical cells via a porous substrate.

Figure 2:
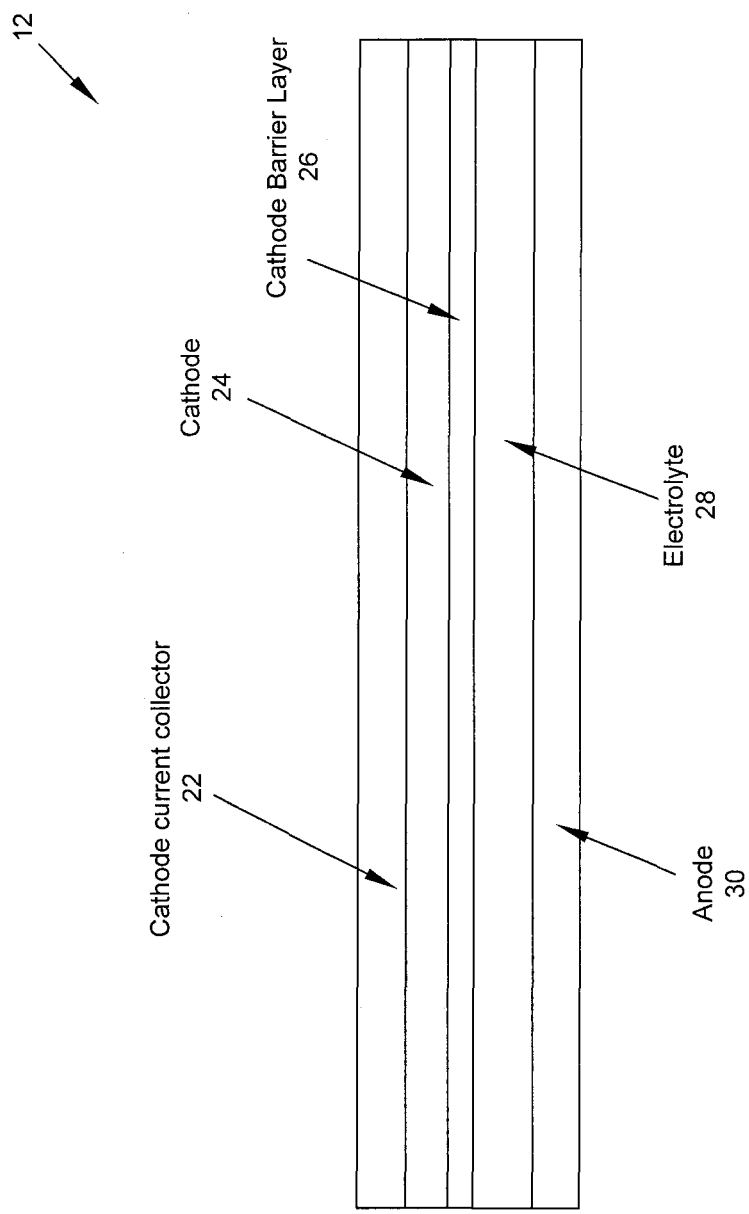
FIG. 2 is a schematic diagram illustrating an example cross section of a fuel cell system in accordance with an embodiment of the present disclosure.

FIG. 2 is a diagram illustrating an example configuration of an electrochemical fuel cell 12 in accordance with an embodiment of the present disclosure. Electrochemical fuel cell 12 may be formed of a plurality of layers screen printed onto substrate 14 (or porous anode barrier layer). This screen printing may include a process whereby a woven mesh has openings through which the fuel cell layers are deposited onto substrate 14. The openings of the screen determine the length and width of the printed layers. Screen mesh, wire diameter, ink solids loading and ink rheology may determine the thickness of the printed layers.

Electrochemical cell 12 includes cathode current collector 22, cathode 24, cathode barrier layer 26, electrolyte 28, and anode 30. In one form, each of the respective components may be a single layer or may be formed of any number of sub-layers. It will be understood that FIG. 2 is not necessarily to scale. For example, vertical dimensions are exaggerated for purposes of clarity of illustration. Additionally, one or more other layers (such as, e.g., a porous anode barrier, ceramic seal, and chemical barrier) may be present in other examples, such as, e.g., an anode current collector which may be disposed between the anode 30 and the porous substrate 14 (not shown).

In electrochemical cell 12, anode 30 conducts free electrons to cathode current collector 22 via interconnect 16 (shown in FIG. 1). Cathode current collector 22 conducts the electrons to cathode 24. Interconnect 16 (shown in FIG. 1) is electrically coupled to anode 30 and to cathode current collector 22 of adjacent electrochemical cells.

Interconnects 16 (FIG. 1) for solid oxide fuel cells (SOFC) are preferably electrically conductive in order to transport electrons from one electrochemical cell to another; mechanically and chemically stable under both oxidizing and reducing environments during fuel cell operation; and, nonporous in order to prevent diffusion of the fuel and/or oxidant through the interconnect. If the interconnect is porous, fuel may diffuse to the oxidant side and burn, resulting in local hot spots that may result in a reduction of fuel cell life, e.g., due to degradation of materials and mechanical failure, as well as reduced efficiency of the fuel cell system. Similarly, the oxidant may diffuse to the fuel side, resulting in burning of the fuel. Severe interconnect leakage may significantly reduce the fuel utilization and performance of the fuel cell, or cause catastrophic failure of fuel cells or stacks.

Interconnect 16 may be formed of a precious metal including Ag, Pd, Au and/or Pt and/or alloys thereof, although other materials may be employed without departing from the scope of the present disclosure. For example, in other embodiments, it is alternatively contemplated that other materials may be employed, including precious metal alloys, such as Ag—Pd, Ag—Au, Ag—Pt, Au—Pd, Au—Pt, Pt—Pd, Ag—Au—Pd, Ag—Au—Pt, Ag—Au—Pd—Pt and/or binary, ternary, quaternary alloys in the Pt—Pd—Au—Ag family, inclusive of alloys having minor non-precious metal additions, cermets composed of a precious metal, precious metal alloy, and an inert ceramic phase, such as alumina, or ceramic phase with minimum ionic conductivity which will not create significant parasitics, such as YSZ (yttria stabilized zirconia, also known as yttria doped zirconia, where yttria doping is 3-8 mol %, preferably 3-5 mol %), ScSZ (scandia stabilized zirconia, where scandia doping is 4-10 mol %, preferably 4-6 mol %), doped ceria, and/or conductive ceramics, such as conductive perovskites with A or B-site substitutions or doping to achieve adequate phase stability and/or sufficient conductivity as an interconnect, e.g., including at least one of doped strontium titanate (such as $La_xSr_{1-x}TiO_{3-\delta}$, x=0.1 to 0.3), LSCM ($La_{1-x}Sr_xCr_{1-y}Mn_yO_3$, x=0.1 to 0.3 and y=0.25 to 0.75), doped yttrium chromites (such as $Y_{1-x}Ca_xCrO_{3-\delta}$, x=0.1-0.3) and/or other doped lanthanum chromites (such as $La_{1-x}Ca_xCrO_{3-\delta}$, where x=0.15-0.3), and conductive ceramics, such as doped strontium titanate, doped yttrium chromites, LSCM ($La_{1-x}Sr_xCr_{1-y}Mn_yO_3$), and other doped lanthanum chromites. In one example, interconnect 16 may be formed of $y(Pd_xPt_{1-x})$-(1-y)YSZ. Where x is from 0 to 1 in weight ratio; preferably x is in the range of 0 to 0.5 for lower hydrogen flux. y is from 0.35 to 0.80 in volume ratio; preferably y is in the range of 0.4 to 0.6.

Anode 30 may be an electrode conductive layer formed of a nickel cermet, such as Ni—YSZ (e.g., where yttria doping in zirconia is 3-8 mol %), Ni—ScSZ (e.g., where scandia doping is 4-10 mol %, preferably including a second doping for example 1 mol % ceria for phase stability for 10 mol % scandia-$ZrO_2$) and/or Ni-doped ceria (such as Gd or Sm doping), doped lanthanum chromite (such as Ca doping on A site and Zn doping on B site), doped strontium titanate (such as La doping on A site and Mn doping on B site), $La_{1-x}Sr_xMn_yCr_{1-y}O_3$ and/or Mn-based R—P phases of the general formula a $(La_{1-x}Sr_x)_{n+1}Mn_nO_{3n+1}$ Alternatively, it is considered that other materials for anode 30 may be employed such as cermets based in part or whole on precious metal. Precious metals in the cermet may include, for example, Pt, Pd, Au, Ag, and/or alloys thereof. The ceramic phase may include, for example, an inactive non-electrically conductive phase, including, for example, YSZ, ScSZ and/or one or more other inactive phases, e.g., having desired CTE in order to control the CTE of the layer to match the CTE of the substrate and electrolyte. In some embodiments, the ceramic phase may include $Al_2O_3$ and/or a spinel such as $NiAl_2O_4$, $MgAl_2O_4$, $MgCr_2O_4$, and $NiCr_2O_4$. In other embodiments, the ceramic phase may be electrically conductive, e.g., doped lanthanum chromite, doped strontium titanate and/or one or more forms of LaSrMnCrO and/or R—P phases of the general formula $(La_{1-x}Sr_x)_{n+1}Mn_nO_{3n+1}$.

Electrolyte 28 may be made from a ceramic material. In one form, a proton and/or oxygen ion conducting ceramic, may be employed. In one form, electrolyte 28 is formed of YSZ, such as 3YSZ and/or 8YSZ. In other embodiments, electrolyte layer 28 may be formed of ScSZ, such as 4ScSZ, 6ScSz and/or 10Sc1CeSZ in addition to or in place of YSZ. In other embodiments, other materials may be employed. For example, it is alternatively considered that electrolyte 28 may be made of doped ceria and/or doped lanthanum gallate. In any event, electrolyte 28 is substantially impervious to diffusion there through of the fluids used by fuel cell 10, e.g., synthesis gas or pure hydrogen as fuel, as well as, e.g., air or $O_2$ as an oxidant, but allows diffusion of oxygen ions or protons.

Cathode current collector 22 may be an electrode conductive layer formed of a conductive ceramic, for example, at least one of $LaNi_xFe_{1-x}O_3$ (such as, e.g., $LaNi_{0.6}Fe_{0.4}O_3$), $La_{1-x}Sr_xMnO_3$ (such as $La_{0.75}Sr_{0.25}MnO_3$), $La_{1-x}Sr_xCoO_3$ and/or $Pr_{1-x}Sr_xCoO_3$, such as $Pr_{0.8}Sr_{0.2}CoO_3$. In other embodiments, Cathode current collector 22 may be formed of other materials, e.g., a precious metal cermet, although other materials may be employed without departing from the scope of the present disclosure. The precious metals in the precious metal cermet may include, for example, Pt, Pd, Au, Ag and/or alloys thereof. The ceramic phase may include, for example, YSZ, ScSZ and $Al_2O_3$, or other non-conductive ceramic materials as desired to control thermal expansion. As will be described below, in some examples, cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In some examples, anode 30 may have a thickness of approximately 5-20 microns, although other values may be employed without departing from the scope of the present disclosure. For example, it is considered that in other embodiments, the anode layer may have a thickness in the range of approximately 5-40 microns. In yet other embodiments, different thicknesses may be used, e.g., depending upon the particular anode material and application.

Electrolyte 28 may have a thickness of approximately 5-15 microns with individual sub-layer thicknesses of approximately 5 microns minimum, although other thickness values may be employed without departing from the scope of the present disclosure. For example, it is considered that in other embodiments, the electrolyte layer may have a thickness in the range of approximately 5-200 microns. In yet other embodiments, different thicknesses may be used, e.g., depending upon the particular materials and application.

Cathode 24 may have a thickness of approximately 3-30 microns, such as, e.g., approximately 5-10 microns, although other values may be employed without departing from the scope of the present disclosure. For example, it is considered that in other embodiments, the cathode layer may have a thickness in the range of approximately 10-50 microns. In yet other embodiments, different thicknesses may be used, e.g., depending upon the particular cathode material and application.

Cathode current collector 22 may have a thickness of approximately 5-100 microns, although other values may be employed without departing from the scope of the present disclosure. For example, it is considered that in other embodiments, cathode current collector 22 may have a thickness less than or greater than the range of approximately 5-100 microns. In yet other embodiments, different thicknesses may be used, e.g., depending upon the particular material and application.

In some examples, cathodes may be electronic conductors only. To improve the cathode performance, separate ionic phase may be added to help oxygen ion transport to triple phase boundary away from the electrolyte interface. Some cathodes, such as nickelates, may be mixed ionic-electronic conductor. Theoretically second ionic phase may not be necessary for these cathode materials. However, there are benefits for these materials, such as nickelate, to form a composite cathode with second ionic phase. The benefits may include, but are not limited to, microstructure control to increase triple phase boundary, improvement of interface adhesion to increase triple phase boundary and reduce interface ohmic resistance, or management of materials diffusion, such as for nickelate.

In accordance with examples of the disclosure, cathode 24 may be formed of a nickelate composite material including a nickelate compound and an ionic conductive material. The nickelate compound may comprise at least one of $Pr_2NiO_4$, $Nd_2NiO_4$, $(Pr_uNd_v)_2NiO_4$, $(Pr_uNd_v)_3Ni_2O_7$, $(Pr_uNd_v)_4Ni_3O_{10}$, or $(Pr_uNd_vM_w)_2NiO_4$, where M is an alkaline earth metal doped on an A-site of Pr and Nd, $0.05 \leq w \leq 0.3$, $0.9 \leq u+v \leq 1.1$, preferably $0.95 \leq u+v \leq 1.0$, $0.9 \leq u+v+w \leq 1.1$, preferably $0.95 \leq u+v+w \leq 1.0$. The composite cathode formed from such nickelate compounds may exhibit relatively low ASR and relatively high performance in terms of ASR or internal resistance of a fuel cell, e.g., compared to other nickelate compounds, such as, e.g., lanthanide nickelate having the general formula $Ln_2NiO_{4+\delta}$. The lower ASR, the higher performance. Higher ASR will result in higher heat loss and less power output. In some examples, the nickelate composite cathode 24 may have an ASR of approximately 0.02 ohm-cm² at 1 bara and about 790 degrees Celsius or less and lower degradation rate.

The ionic conductive material of cathode 24 may be provided to improve one more properties of cathode 24, such as, e.g., increased triple phase boundary, improved adhesion with cathode barrier layer, desired phase constitution, and reduced degradation of cathode layer 24 in a high temperature operating environment compared to that of a cathode with only the nickelate composition. The ionic conductive material may comprise a first co-doped ceria with a general formula of $(A_xB_y)Ce_{1-x-y}O_2$, where A and B of the first co-doped ceria are rare earth metals. In some examples, the one of A and B of the first co-doped ceria is Pr or Nd. In some examples, A is Pr and B is Nd. Theoretically any rare earth metal can be selected for A or B. However, since there is Pr or Nd on A site of nickelate, Pr, or Nd, or Pr and Nd may be preferred for A, or B or A and B for less material inter-diffusion between nickelate and doped ceria.

In some examples, examples of the disclosure may control and manage phase constitution in a nickelate composite cathode to maintain desired phases for lower cathode or fuel cell degradation rate through minimizing material diffusion. For example, the presence and composition of the ionic conductive material may manage material interdiffusion and maintain desired phase constitution in nickelate composite cathode 24. Nickelate has a general formulation, $A_{n+1}B_nO_{3n+1}$ (where n=1, 2, 3, etc.), and different phase with composition change. When n=1, the nickelate phase mentioned herein may not be stable under fuel cell operating conditions, and a rare earth metal in A site, such as Pr, tends to exsolutes from nickelate structure to form oxide. $PrO_x$ oxide, which has higher CTE (e.g., about 19 ppm/K from room temperature to about 900 degrees Celsuis), compared to nickelate compounds (e.g., about 14 ppm/K). Continued exsolution of rare earth metal from the A site may result in Ni rich in B site, and then Ni may exsolute from B site to form NiO which is known inactive catalyst. Both rare earth metal oxide (such as $PrO_x$) and NiO may be referred to as the third phase in the composite cathode. The formation of third phases in nickelate composite cathode may change cathode microstructure and thermal expansion to cause degradation due to reduction of triple phase boundary and local cathode detachment from electrolyte or cathode barrier layer due to thermal stress.

Therefore, rare earth metal oxide, such as $PrO_x$, and NiO may not be desired phases. Doped ceria may be a stable phase. When forming composite cathode with a nickelate compound, it can adsorb rare earth metal oxide, such as $PrO_x$, exsoluted from the nickelate to form solid solution to avoid undesired phase formation. Especially if doped ceria already contains Pr, or Nd, or both Pr and Nd in its starting composition, it can slow down or hinder rare earth metal exulution from nickelate. In this manner, in some examples, the ionic phase can manage phase constitution in nickelate composite cathode, which can be achieved through controlling the composition of doped ceria and the amount of doped ceria added to nickelate.

Cathode 24 may include any suitable concentrations of nickelate compound and ionic conductive compound. In some examples, cathode 24 may include approximately 10 weight percent (wt %) to approximately 95 wt % of the nickelate compound, such as, e.g., approximately 50 wt % to approximately 70 wt % of the nickelate compound. In some examples, cathode 24 may include approximately 5 wt % to approximately 90 wt % of the ionic conductive compound, such as, e.g., approximately 20 wt % to approximately 50 wt % of the ionic conductive compound. In some examples, the preferred ionic phase ratio to nickelate may be about 10 wt % to about 50 wt % depending on chemical composition of both doped ceria and nickelate compound. If the ionic phase is too low, it cannot adsorb all the rare earth metal oxide exsoluted from nickelate, which will form undesired third phase. If the ionic phase is too high, the exsolution of rare earth metal from nickelate may continue since ionic phase can adsorb more rare earth metal till B site rich nickelate compound is formed, which may result in NiO exsolution from B site of nickelate to form undesired third phase NiO. In some examples, cathode 24 may consist of, consist essentially of, or comprise the nickelate compound and ionic conductive compound.

The composition of cathode 24 may change from the composition as-fabricated following operation of fuel cell 12 at a high temperature (e.g., greater than, e.g., about 700 degrees Celsius. For example, rare earth metal exsolution from nickelate may change cathode microstructure to reduce triple phase boundary and increase cathode CTE to cause cathode detachment from electrolyte or cathode barrier layer in local area. It may further cause B site rich nickelate cathode formation which may result in NiO exsolution from B site of nickelate cathode. All these microstructural and phase changes may increase cathode ASR. In some examples, cathode 24 is substantially free of oxide formed exsoluted A-site element and/or B-site element from the nickelate compound following operation at a temperature of approximately 790 degrees Celsius or greater after approximately 100 hours with degradation rate of about 0.03 ohm-cm$^2$/1000 hr using symmetric button cell. In some examples, cathode 24 includes diffused exsolute from the nickelate in a phase of the ionic conductive material following operation at a temperature of approximately 790 degrees Celsuis or greater after about 100 to about 2200 hours with degradation rate of about 0.002 to about 0.013 ohm-cm$^2$/1000 hr using segmented-in-series cell design. In some examples, fuel cell with cathode 24 exhibits an area specific resistance (ASR) of approximately 0.22 ohm-cm$^2$ or less following operation at a temperature of approximately 860 degrees Celsuis after approximately 6600 hours.

Additionally, as shown in FIG. 2, electrochemical fuel cell 12 may include a cathode barrier layer 26 between electrolyte 28 and cathode 24. Cathode barrier layer 26 may be formed of a second co-doped ceria with a general formula $(A_xB_y)Ce_{1-x-y}O_2$, where at least one of A or B of the second co-doped ceria is Pr or Nd. In some examples, A is Pr and B is Nd.

In some examples, the function of cathode barrier layer 26 may be at least twofold. First, the barrier layer can prevent chemical interaction between electrolyte 28 (e.g., Y or Sc stabilized zirconia) and nickelate. Without cathode barrier layer 26, the rare earth metal, such as Pr, in nickelate may interact with electrolyte 28 to form $Pr_2Zr_2O_7$ undesired phase to increase cell ASR under some conditions during fuel cell operation. Second, cathode barrier layer 26 can help to control rare earth metal exsolution from nickelate compound based on concentration difference (material tends to migrate from higher concentration to lower concentration) to manage phase constitution in cathode 24 to keep desired phases for lower degradation rate. For example, $(Pr_xNd_y)Ce_{1-x-y}O_2$ cathode barrier may be selected as cathode barrier layer 26 for $(Pr_uNd_v)_2NiO_4$, $(Pr_uNd_v)_3Ni_2O_7$, and $(Pr_uNd_v)_4Ni_3O_{10}$ cathode and composite cathode composed of such nickelate compounds.

In one example of fuel cell 12, cathode 24 is formed of a composite nickelate having the general formula $Pr_2NiO_4$, $-(A_xB_y)Ce_{1-x-y}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y≤0.5 (preferably 0.05≤y≤0.3). In some examples, preferably one of A and B is Pr. Cathode barrier layer 26 is formed of a composition having the general formula $(A_xB_y)Ce_{1-x-y}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y<0.5 (preferably 0.05≤y≤0.3). In some examples, preferably A or B is Pr. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $Nd_2NiO_4, -A_xCe_{(1-x)}O_2$, where A is rare earth metal (such as, e.g., La, Pr, Nd, Gd, Sm, Tb, Dy, Yb, Y, Ho, Er, and the like), and 0<x<1 (preferably 0.1≤x≤0.4). Cathode barrier layer 26 is formed of a composition having the general formula $A_xCe_{(1-x)}O_2$, where A is rare earth metal (such as, e.g., La, Pr, Nd, Gd, Sm, Tb, Dy, Yb, Y, Ho, Er, and the like), and 0<x<1 (preferably 0.1≤x≤0.4). Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $Nd_2NiO_4, -(A_xB_y)Ce_{1-x-y}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y≤0.5 (preferably 0.05≤y≤0.3). In some examples, preferably one of A and B is Nd. Cathode barrier layer 26 is formed of a composition having the general formula $(A_xB_y)Ce_{1-x-y}O_2$, where A is rare earth metal (such as, e.g., La, Pr, Nd, Gd, Sm, Tb, Dy, Yb, Y, Ho, Er, and the like), 0<x<0.5 (preferably 0.05≤x≤0.3), B is different rare earth metal element from A (such as, e.g., Gd, La, Pr, Nd, Sm, Tb, Dy, Yb, Y, Ho, Er, and the like), and 0≤y<0.5 (preferably 0.05≤y≤0.3). In some example, preferably A or B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $(Pr_uNd_v)_2NiO_4, -(A_xB_y)Ce_{1-x-y}O_2$, where A is rare earth metal (such as, e.g., La, Pr, Nd, Gd, Sm, Tb, Dy, Yb, Y, Ho, Er, and the like), 0≤x<0.5 (preferably 0.05≤x≤0.3), B is different rare earth metal element from A (such as, e.g., Gd, La, Pr, Nd, Sm, Tb, Dy, Yb, Y, Ho, Er, and the like), 0≤y<0.5 (preferably 0.05≤y≤0.3), 0<u<1, and 0<v<1 (preferably 0.25<u<0.75 and 0.25<v<0.75). In some examples, preferably one of A and B are Pr and Nd. This may include following cases: 1) A or B is Pr; 2) A or B is Nd; and 3) A is Pr and B is Nd. Cathode barrier layer 26 is formed of a composition having the general formula $(A_xB_y)Ce_{1-x-y}O_2$, where A is rare earth metal (such as, e.g., La, Pr, Nd, Gd, Sm, Tb, Dy, Yb, Y, Ho, Er, and the like), $0<x<0.5$ (preferably $0.05 \leq x \leq 0.3$), B is different rare earth metal element from A (such as, e.g., Gd, La, Pr, Nd, Sm, Tb, Dy, Yb, Y, Ho, Er, and the like), and $0 \leq y<0.5$ (preferably $0.05 \leq y \leq 0.3$). In some examples, preferably A and B are Pr and Nd. This may include following cases: 1) A or B is Pr; 2) A or B is Nd; and 3) A is Pr and B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $(Pr_uNd_v)_3Ni_2O_7$, $-(A_xB_y)Ce_{1-x-y}O_2$, where A is rare earth metal (such as, e.g., La, Pr, Nd, Gd, Sm, Tb, Dy, Yb, Y, Ho, Er, and the like), $0<x<0.5$ (preferably $0.05 \leq x \leq 0.3$), B is different rare earth metal element from A (such as, e.g., Gd, La, Pr, Nd, Sm, Tb, Dy, Yb, Y, Ho, Er, and the like), $0 \leq y<0.5$ (preferably $0.05 \leq y \leq 0.3$), $0<u<1$, and $0<v<1$ (preferably $0.25<u<0.75$ and $0.25<v<0.75$). In some examples, preferably one of A and B are Pr and Nd. This may include following cases: 1) A or B is Pr; 2) A or B is Nd; and 3) A is Pr and B is Nd. Cathode barrier layer 26 is formed of a composition having the general formula $(A_xB_y)Ce_{1-x-y}O_2$, where A is rare earth metal (such as, e.g., La, Pr, Nd, Gd, Sm, Tb, Dy, Yb, Y, Ho, Er, and the like), $0<x<0.5$ (preferably $0.05 \leq x \leq 0.3$), B is different rare earth metal from A (such as, e.g., Gd, La, Pr, Nd, Sm, Tb, Dy, Yb, Y, Ho, Er, and the like), and $0 \leq y<0.5$ (preferably $0.05 \leq y \leq 0.3$). In some examples, preferably A and B are Pr and Nd. This may include following cases: 1) A or B is Pr; 2) A or B is Nd; and 3) A is Pr and B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $(Pr_uNd_v)_4Ni_3O_{10}$, $-(A_xB_y)Ce_{1-x-y}O_2$, where A is rare earth metal (such as, e.g., La, Pr, Nd, Gd, Sm, Tb, Dy, Yb, Y, Ho, Er, and the like), $0<x<0.5$ (preferably $0.05 \leq x \leq 0.3$), B is different rare earth metal element from A (such as, e.g., Gd, La, Pr, Nd, Sm, Tb, Dy, Yb, Y, Ho, Er, and the like), and $0 \leq y<0.5$ (preferably $0.05 \leq y \leq 0.3$). In some examples, preferably one of A and B are Pr and Nd. This may include following cases: 1) A or B is Pr; 2) A or B is Nd; and 3) A is Pr and B is Nd. Cathode barrier layer 26 is formed of a composition having the general formula $(A_xB_y)Ce_{1-x-y}O_2$, where A is rare earth metal (such as, e.g., La, Pr, Nd, Gd, Sm, Tb, Dy, Yb, Y, Ho, Er, and the like), $0<x<0.5$ (preferably $0.05 \leq x \leq 0.3$), B is different rare earth metal from A (such as, e.g., Gd, La, Pr, Nd, Sm, Tb, Dy, Yb, Y, Ho, Er, and the like), $0 \leq y<0.5$ (preferably $0.05 \leq y \leq 0.3$), $0<u<1$, and $0<v<1$ (preferably $0.25<u<0.75$ and $0.25<v<0.75$. In some examples, preferably A and B are Pr and Nd. This may include following cases: 1) A or B is Pr; 2) A or B is Nd; and 3) A is Pr and B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $(Pr_uNd_vM_w)_2NiO_4$, $-(A_xB_y)Ce_{1-x-y}O_2$, where M is alkaline earth metal (such as, e.g., Sr, Ca, Ba, and the like), $0<u<1$ and $0<v<1$ (preferably $0.3<u<0.7$ and $0.3<v<0.7$ or $0.25<u<0.75$ and $0.25<v<0.75$), $0<w<0.3$ (preferably, $0.05<w<0.15$), A is rare earth metal (such as, e.g., La, Pr, Nd, Gd, Sm, Tb, Dy, Yb, Y, Ho, Er, and the like), $0<x<0.5$ (preferably $0.05 \leq x \leq 0.3$), B is different rare earth metal element from A (such as, e.g., Gd, La, Pr, Nd, Sm, Tb, Dy, Yb, Y, Ho, Er, and the like), and $0 \leq y<0.5$ (preferably $0.05 \leq y \leq 0.3$). In some examples, preferably one of A and B are Pr and Nd. This may include following cases: 1) A or B is Pr; 2) A or B is Nd; and 3) A is Pr and B is Nd. Cathode barrier layer 26 is formed of a composition having the general formula $(A_xB_y)Ce_{1-x-y}O_2$, where A is rare earth metal (such as, e.g., La, Pr, Nd, Gd, Sm, Tb, Dy, Yb, Y, Ho, Er, and the like), $0<x<0.5$ (preferably $0.05 \leq x \leq 0.3$), B is different rare earth metal from A (such as, e.g., Gd, La, Pr, Nd, Sm, Tb, Dy, Yb, Y, Ho, Er, and the like), and $0 \leq y<0.5$ (preferably $0.05 \leq y \leq 0.3$). In some examples, preferably A and B are Pr and Nd. This may include following cases: 1) A or B is Pr; 2) A or B is Nd; and 3) A is Pr and B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $(Pr_uNd_vM_w)_2Ni_{1-z}N_zO_4$-$(A_xB_y)Ce_{1-x-y}O_2$, where M is alkaline earth metal (such as, e.g., Sr, Ca, Ba, and the like), $0<u<1$, and $0<v<1$ (preferably $0.25<u<0.75$ and $0.25<v<0.75$), $0<w<0.3$ (preferably, $0.05<w<0.15$), N is transition metal (such as, e.g., Cu, Co, Mn, Fe, Cr, and the like), $0<z<0.5$ (preferably $0.05<z<0.2$), A is rare earth metal (such as La, Pr, Nd, Gd, Sm, Tb, Dy, Yb, Y, Ho, Er, and the like), $0<x<0.5$ (preferably $0.05 \leq x \leq 0.3$), B is different rare earth metal element from A (such as, e.g., Gd, La, Pr, Nd, Sm, Tb, Dy, Yb, Y, Ho, Er, and the like), and $0 \leq y<0.5$ (preferably $0.05 \leq y \leq 0.3$). In some examples, preferably one of A and B are Pr and Nd. This may include following cases: 1) A or B is Pr; 2) A or B is Nd; and 3) A is Pr and B is Nd. Cathode barrier layer 26 may be formed of a composition having the general formula $(A_xB_y)Ce_{1-x-y}O_2$, where A is rare earth metal (such as, e.g., La, Pr, Nd, Gd, Sm, Tb, Dy, Yb, Y, Ho, Er, and the like), $0<x<0.5$ (preferably $0.05 \leq x \leq 0.3$), B is different rare earth metal from A (such as, e.g., Gd, La, Pr, Nd, Sm, Tb, Dy, Yb, Y, Ho, Er, and the like), and $0 \leq y<0.5$ (preferably $0.05 \leq y \leq 0.3$). In some examples, preferably A and B are Pr and Nd. This may include following cases: 1) A or B is Pr; 2) A or B is Nd; and 3) A is Pr and B is Nd. Cathode current collector 22 may be formed of a conductive ceramic which is chemically compatible with the nickelate composite of cathode 24, such as, e.g., LNF. For example, when the conductive ceramic is chemically compatible with the nickelate composite, substantially no chemical reaction occurs when the two materials contact each other and there is no third phase formation.

In another example, cathode 24 is formed of a composite nickelate having the general formula $Ln_2NiO_4$-$A_{1-x}B_xO_y$, where Ln is a rare earth metal except for La (such as, e.g., Pr, Nd, Sm, etc. and preferably Pr), A is a rare earth metal except for Ce (such as, e.g., La, Pr, Nd, Gd, Sm, Tb, Dy, Yb, Y, Ho, Er, etc.), B is a rare earth metal which is both different from A and exclusive of Ce (such as, e.g., Gd, La, Pr, Nd, Sm, Tb, Dy, Yb, Y, Ho, Er, etc.), $0 \leq x < 1$ (preferably $0.25 \leq x \leq 0.75$), $1.5 \leq y \leq 2.0$ (preferably $1.8 \leq y \leq 2.0$) and preferably one of A and B is Pr. Cathode barrier layer 26 is formed of a composition having the general formula $C_wD_zCe_{(1-w-z)}O_{2-\delta}$, where C is rare earth metal (such as, e.g., La, Pr, Nd, Gd, Sm, Tb, Dy, Yb, Y, Sc, Ho, Er, etc.), $0 < w < 0.75$ (preferably $0.05 \leq w \leq 0.5$), D is a rare earth metal which is different from C (such as, e.g., Gd, La, Pr, Nd, Sm, Tb, Dy, Yb, Y, Sc, Ho, Er, etc.), $0 \leq z < 0.75$ (preferably $0.05 \leq z \leq 0.5$), and $\delta$ is an oxygent stoichiometry dependent on the amount of w+z, $0 \leq \delta < 0.5$ (preferably $0 \leq \delta \leq 0.3$). The cathode current collector 22 may be formed of a conductive oxide material which is chemically compatible with a nickelate composite cathode, such as, e.g., LNF and LSM, etc., such that no chemical reaction occurs when the two materials contact each other and there is no third phase formation.

In another example, cathode 24 is formed of a composite nickelate having the general formula $(Ln_uM1_v)_2NiO_4$-$A_{1-x}B_xO_y$, where Ln is a rare earth metal except for La (such as, e.g., Pr, Nd, Sm, etc.), $0 < u \leq 1$ (preferably $0.25 \leq u \leq 0.75$), M1 is a rare earth metal which is both different from Ln and exclusive of La (such as, e.g., Pr, Nd, Sm, Gd, Tb, Dy, Yb, Y, Ho, Er, etc.), $0 < v < 1$ (preferably $0.25 \leq v \leq 0.75$), $0.9 \leq u+v < 1.1$ (preferably $0.95 \leq u+v \leq 1.05$), preferably one of Ln and M1 is Pr, A is a rare earth metal except for Ce (such as, e.g., La, Pr, Nd, Gd, Sm, Tb, Dy, Yb, Y, Ho, Er, etc.), B is a rare earth metal which is both different from A and exclusive of Ce (such as, e.g., Gd, La, Pr, Nd, Sm, Tb, Dy, Yb, Y, Ho, Er, etc.), $0 \leq x < 1$ (preferably $0.25 \leq x \leq 0.75$), $1.5 \leq y \leq 2.0$ (preferably $1.8 \leq y \leq 2.0$) and preferably one of A and B is Pr. Cathode barrier layer 26 is formed of a composition having the general formula $C_wD_zCe_{(1-w-z)}O_{2-\delta}$, where C is rare earth metal (such as, e.g., La, Pr, Nd, Gd, Sm, Tb, Dy, Yb, Y, Sc, Ho, Er, etc.), $0 < w < 0.75$ (preferably $0.05 \leq w \leq 0.5$), D is a rare earth metal which is different from C (such as, e.g., Gd, La, Pr, Nd, Sm, Tb, Dy, Yb, Y, Sc, Ho, Er, etc.), $0 \leq z < 0.75$ (preferably $0.05 \leq z \leq 0.5$), and $\delta$ is an oxygent stoichiometry dependent on the amount of w+z, $0 \leq \delta < 0.5$ (preferably $0 \leq \delta \leq 0.3$). The cathode current collector 22 may be formed of a conductive oxide material which is chemically compatible with a nickelate composite cathode, such as, e.g., LNF and LSM, etc., such that no chemical reaction occurs when the two materials contact each other and there is no third phase formation.

In another example, cathode 24 is formed of a composite nickelate having the general formula $(Ln_uM1_v)_{n+1}Ni_nO_{3n+1}$-$A_{1-x}B_xO_y$, where Ln is a rare earth metal except for La (such as, e.g., Pr, Nd, Sm, etc.), $0 < u \leq 1$ (preferably $0.25 \leq u \leq 0.75$), M1 is a rare earth metal which is both different from Ln and exclusive of La (such as, e.g., Pr, Nd, Sm, Gd, Tb, Dy, Yb, Y, Ho, Er, etc.), $0 < v < 1$ (preferably $0.25 \leq v \leq 0.75$), $0.9 \leq u+v < 1.1$ (preferably $0.95 \leq u+v \leq 1.05$), $1 < n$ (preferably $1 < n \leq 3$), preferably one of Ln and M1 is Pr, A is a rare earth metal except for Ce (such as, e.g., La, Pr, Nd, Gd, Sm, Tb, Dy, Yb, Y, Ho, Er, etc.), B is a rare earth metal which is both different from A and exclusive of Ce (such as, e.g., Gd, La, Pr, Nd, Sm, Tb, Dy, Yb, Y, Ho, Er, etc.), $0 \leq x < 1$ (preferably $0.25 \leq x \leq 0.75$), $1.5 \leq y \leq 2.0$ (preferably $1.8 \leq y \leq 2.0$) and preferably one of A and B is Pr. Cathode barrier layer 26 is formed of a composition having the general formula $C_wD_zCe_{(1-w-z)}O_{2-\delta}$, where C is rare earth metal (such as, e.g., La, Pr, Nd, Gd, Sm, Tb, Dy, Yb, Y, Sc, Ho, Er, etc.), $0 < w < 0.75$ (preferably $0.05 \leq w \leq 0.5$), D is a rare earth metal which is different from C (such as, e.g., Gd, La, Pr, Nd, Sm, Tb, Dy, Yb, Y, Sc, Ho, Er, etc.), $0 \leq z < 0.75$ (preferably $0.05 \leq z \leq 0.5$), and $\delta$ is an oxygent stoichiometry value dependent on the amount of w+z, $0 \leq \delta < 0.5$ (preferably $0 \leq \delta \leq 0.3$). The cathode current collector 22 may be formed of a conductive oxide material which is chemically compatible with a nickelate composite cathode, such as, e.g., LNF and LSM, etc., such that no chemical reaction occurs when the two materials contact each other and there is no third phase formation.

In another example, cathode 24 is formed of a composite nickelate having the general formula $(Ln_uM1_v)_{n+1}(Ni_{1-t}N_t)_nO_{3n+1}$-$A_{1-x}B_xO_y$, where Ln is a rare earth metal except for La (such as, e.g., Pr, Nd, Sm, etc.), $0 < u \leq 1$ (preferably $0.25 \leq u \leq 0.75$), M1 is a rare earth metal which is both different from Ln and exclusive of La (such as, e.g., Pr, Nd, Sm, Gd, Tb, Dy, Yb, Y, Ho, Er, etc.), $0 \leq v < 1$ (preferably $0.25 \leq v \leq 0.75$), $0.9 \leq u+v < 1.1$ (preferably $0.95 \leq u+v \leq 1.05$), preferably one of Ln and M1 is Pr, N is one or more transition metals (such, e.g., Mn, Fe, Cu, Ti, Cr, Co, V, Zn, etc.), $0 < t \leq 0.5$ (preferably $0.02 \leq t \leq 0.3$), $1 \leq n$ (preferably $1 \leq n \leq 3$), preferably N is Cu, A is a rare earth metal except for Ce (such as, e.g., La, Pr, Nd, Gd, Sm, Tb, Dy, Yb, Y, Ho, Er, etc.), B is a rare earth metal which is both different from A and exclusive of Ce (such as, e.g., Gd, La, Pr, Nd, Sm, Tb, Dy, Yb, Y, Ho, Er, etc.), $0 \leq x < 1$ (preferably $0.25 \leq x \leq 0.75$), $1.5 \leq y \leq 2.0$ (preferably $1.8 \leq y \leq 2.0$) and preferably one of A and B is Pr. Cathode barrier layer 26 is formed of a composition having the general formula $C_wD_zCe_{(1-w-z)}O_{2-\delta}$, where C is rare earth metal (such as, e.g., La, Pr, Nd, Gd, Sm, Tb, Dy, Yb, Y, Sc, Ho, Er, etc.), $0 < w < 0.75$ (preferably $0.05 \leq w \leq 0.5$), D is a rare earth metal which is different from C (such as, e.g., Gd, La, Pr, Nd, Sm, Tb, Dy, Yb, Y, Sc, Ho, Er, etc.), $0 \leq z < 0.75$ (preferably $0.05 \leq z \leq 0.5$), and $\delta$ is an oxygent stoichiometry value dependent on the amount of w+z, $0 \leq \delta < 0.5$ (preferably $0 \leq \delta \leq 0.3$). The cathode current collector 22 may be formed of a conductive oxide material which is chemically compatible with a nickelate composite cathode, such as, e.g., LNF and LSM, etc., such that no chemical reaction occurs when the two materials contact each other and there is no third phase formation.

In another example, cathode 24 is formed of a composite nickelate having the general formula $Ln_2NiO_4$-$A_{1-x}B_xO_y$—$C_wD_zCe_{(1-w-z)}O_{2-\delta}$, where Ln is a rare earth metal (such as, e.g., La, Pr, Nd, Sm, etc. and preferably Pr), A is a rare earth metal except for Ce (such as, e.g., La, Pr, Nd, Gd, Sm, Tb, Dy, Yb, Y, Ho, Er, etc.), B is a rare earth metal which is both different from A and exclusive of Ce (such as, e.g., Gd, La, Pr, Nd, Sm, Tb, Dy, Yb, Y, Ho, Er, etc.), $0 \leq x < 1$ (preferably $0.25 \leq x \leq 0.75$), $1.5 \leq y \leq 2.0$ (preferably $1.8 \leq y \leq 2.0$) and preferably one of A and B is Pr, C is rare earth metal (such as, e.g., La, Pr, Nd, Gd, Sm, Tb, Dy, Yb, Y, Sc, Ho, Er, etc.), $0 < w < 0.75$ (preferably $0.05 \leq w \leq 0.5$), D is a rare earth metal which is different from C (such as, e.g., Gd, La, Pr, Nd, Sm, Tb, Dy, Yb, Y, Sc, Ho, Er, etc.), $0 \leq z < 0.75$ (preferably $0.05 \leq z \leq 0.5$), $\delta$ is an oxygent stoichiometry dependent on the amount of w+z, $0 \leq \delta < 0.5$ (preferably $0 \leq \delta \leq 0.3$), and preferably one of C and D is Pr. Cathode barrier layer 26 is formed of a composition having the general formula $C_wD_zCe_{(1-w-z)}O_{2-\delta}$, where C is rare earth metal (such as, e.g., La, Pr, Nd, Gd, Sm, Tb, Dy, Yb, Y, Sc, Ho, Er, etc.), $0 < w < 0.75$ (preferably $0.05 \leq w \leq 0.5$), D is a rare earth metal which is different from C (such as, e.g., Gd, La, Pr, Nd, Sm, Tb, Dy, Yb, Y, Sc, Ho, Er, etc.), $0 \leq z < 0.75$ (preferably $0.05 \leq z \leq 0.5$), and $\delta$ is an oxygent stoichiometry dependent on the amount of w+z, $0 \leq \delta < 0.5$ (preferably $0 \leq \delta \leq 0.3$). The cathode current collector 22 may be formed of a conductive oxide material which is chemically compatible with a nickelate composite cathode, such as, e.g., LNF and LSM, etc., such that no chemical reaction occurs when the two materials contact each other and there is no third phase formation.

In another example, cathode 24 is formed of a composite nickelate having the general formula $(Ln_uM1_v)_2NiO_4$-$A_{1-x}B_xO_y$—$C_wD_zCe_{(1-w-z)}O_{2-\delta}$, where Ln is a rare earth metal (such as, e.g., La, Pr, Nd, Sm, etc.), $0<u\le1$ (preferably $0.25\le u\le0.75$), M1 is a rare earth metal different from Ln (such as, e.g., La, Pr, Nd, Sm, Gd, Tb, Dy, Yb, Y, Ho, Er, etc.), $0<v<1$ (preferably $0.25\le v\le0.75$), $0.9\le u+v<1.1$ (preferably $0.95\le u+v\le1.05$), preferably one of Ln and M1 is Pr, A is a rare earth metal except for Ce (such as, e.g., La, Pr, Nd, Gd, Sm, Tb, Dy, Yb, Y, Ho, Er, etc.), B is a rare earth metal which is both different from A and exclusive of Ce (such as, e.g., Gd, La, Pr, Nd, Sm, Tb, Dy, Yb, Y, Ho, Er, etc.), $0\le x<1$ (preferably $0.25\le x\le0.75$), $1.5\le y\le2.0$ (preferably $1.8\le y\le2.0$) and preferably one of A and B is Pr, C is rare earth metal (such as, e.g., La, Pr, Nd, Gd, Sm, Tb, Dy, Yb, Y, Sc, Ho, Er, etc.), $0<w<0.75$ (preferably $0.05\le w\le0.5$), D is a rare earth metal which is different from C (such as, e.g., Gd, La, Pr, Nd, Sm, Tb, Dy, Yb, Y, Sc, Ho, Er, etc.), $0\le z<0.75$ (preferably $0.05\le z\le0.5$), and $\delta$ is an oxygent stoichiometry dependent on the amount of w+z, $0\le\delta<0.5$ (preferably $0\le\delta\le0.3$), and preferably one of C and D is Pr. Cathode barrier layer 26 is formed of a composition having the general formula $C_wD_zCe_{(1-w-z)}O_{2-\delta}$, where C is rare earth metal (such as, e.g., La, Pr, Nd, Gd, Sm, Tb, Dy, Yb, Y, Sc, Ho, Er, etc.), $0<w<0.75$ (preferably $0.05\le w\le0.5$), D is a rare earth metal which is different from C (such as, e.g., Gd, La, Pr, Nd, Sm, Tb, Dy, Yb, Y, Sc, Ho, Er, etc.), $0\le z<0.75$ (preferably $0.05\le z\le0.5$), and $\delta$ is an oxygent stoichiometry dependent on the amount of w+z, $0\le\delta<0.5$ (preferably $0\le\delta\le0.3$). The cathode current collector 22 may be formed of a conductive oxide material which is chemically compatible with a nickelate composite cathode, such as, e.g., LNF and LSM, etc., such that no chemical reaction occurs when the two materials contact each other and there is no third phase formation.

In another example, cathode 24 is formed of a composite nickelate having the general formula $(Ln_uM1_v)_{n+1}Ni_nO_{3n+1}$-$A_{1-x}B_xO_y$—$C_wD_zCe_{(1-w-z)}O_{2-\delta}$, where Ln is a rare earth metal (such as, e.g., La, Pr, Nd, Sm, etc.), $0<u\le1$ (preferably $0.25\le u\le0.75$), M1 is a rare earth metal different from Ln (such as, e.g., La, Pr, Nd, Sm, Gd, Tb, Dy, Yb, Y, Ho, Er, etc.), $0<v<1$ (preferably $0.25\le v\le0.75$), $0.9\le u+v<1.1$ (preferably $0.95\le u+v\le1.05$), $1<n$ (preferably $1\le n\le3$), preferably one of Ln and M1 is Pr, A is a rare earth metal except for Ce (such as, e.g., La, Pr, Nd, Gd, Sm, Tb, Dy, Yb, Y, Ho, Er, etc.), B is a rare earth metal which is both different from A and exclusive of Ce (such as, e.g., Gd, La, Pr, Nd, Sm, Tb, Dy, Yb, Y, Ho, Er, etc.), $0\le x<1$ (preferably $0.25\le x\le0.75$), $1.5\le y\le2.0$ (preferably $1.8\le y\le2.0$) and preferably one of A and B is Pr, C is rare earth metal (such as, e.g., La, Pr, Nd, Gd, Sm, Tb, Dy, Yb, Y, Sc, Ho, Er, etc.), $0<w<0.75$ (preferably $0.05\le w\le0.5$), D is a rare earth metal which is different from C (such as, e.g., Gd, La, Pr, Nd, Sm, Tb, Dy, Yb, Y, Sc, Ho, Er, etc.), $0\le z<0.75$ (preferably $0.05\le z\le0.5$), and $\delta$ is an oxygent stoichiometry dependent on the amount of w+z, $0\le\delta<0.5$ (preferably $0\le\delta\le0.3$), and preferably one of C and D is Pr.

Cathode barrier layer 26 is formed of a composition having the general formula $C_wD_zCe_{(1-w-z)}O_{2-\delta}$, where C is rare earth metal (such as, e.g., La, Pr, Nd, Gd, Sm, Tb, Dy, Yb, Y, Sc, Ho, Er, etc.), $0<w<0.75$ (preferably $0.05\le w\le0.5$), D is a rare earth metal which is different from C (such as, e.g., Gd, La, Pr, Nd, Sm, Tb, Dy, Yb, Y, Sc, Ho, Er, etc.), $0\le z<0.75$ (preferably $0.05\le z\le0.5$), and $\delta$ is an oxygent stoichiometry value dependent on the amount of w+z, $0\le\delta<0.5$ (preferably $0\le\delta\le0.3$). The cathode current collector 22 may be formed of a conductive oxide material which is chemically compatible with a nickelate composite cathode, such as, e.g., LNF and LSM, etc., such that no chemical reaction occurs when the two materials contact each other and there is no third phase formation.

In another example, cathode 24 is formed of a composite nickelate having the general formula $(Ln_uM1_v)_{n+1}(Ni_{1-t}N_t)_nO_{3n+1}$-$A_{1-x}B_xO_y$—$C_wD_zCe_{(1-w-z)}O_{2-\delta}$, where Ln is a rare earth metal (such as, e.g., La, Pr, Nd, Sm, etc.), $0<u\le1$ (preferably $0.25\le u\le0.75$), M1 is a rare earth metal different from Ln (such as, e.g., La, Pr, Nd, Sm, Gd, Tb, Dy, Yb, Y, Ho, Er, etc.), $0\le v<1$ (preferably $0.25\le v\le0.75$), $0.9\le u+v<1.1$ (preferably $0.95\le u+v\le1.05$), preferably one of Ln and M1 is Pr, N is one or more transitions metals (such as, e.g., Mn, Fe, Cu, Ti, Cr, Co, V, Zn, etc.), $0\le t\le0.5$ (preferably $0.02\le t\le0.3$), $1\le n$ (preferably $1\le n\le3$), preferably N is Cu, A is a rare earth metal except for Ce (such as, e.g., La, Pr, Nd, Gd, Sm, Tb, Dy, Yb, Y, Ho, Er, etc.), B is a rare earth metal which is both different from A and exclusive of Ce (such as, e.g., Gd, La, Pr, Nd, Sm, Tb, Dy, Yb, Y, Ho, Er, etc.), $0\le x<1$ (preferably $0.25\le x\le0.75$), $1.5\le y\le2.0$ (preferably $1.8\le y\le2.0$) and preferably one of A and B is Pr, C is rare earth metal (such as, e.g., La, Pr, Nd, Gd, Sm, Tb, Dy, Yb, Y, Sc, Ho, Er, etc.), $0<w<0.75$ (preferably $0.05\le w\le0.5$), D is a rare earth metal which is different from C (such as, e.g., Gd, La, Pr, Nd, Sm, Tb, Dy, Yb, Y, Sc, Ho, Er, etc.), $0\le z<0.75$ (preferably $0.05\le z\le0.5$), and $\delta$ is an oxygent stoichiometry dependent on the amount of w+z, $0\le\delta<0.5$ (preferably $0\le\delta\le0.3$), and preferably one of C and D is Pr. Cathode barrier layer 26 is formed of a composition having the general formula $C_wD_zCe_{(1-w-z)}O_{2-\delta}$, where C is rare earth metal (such as, e.g., La, Pr, Nd, Gd, Sm, Tb, Dy, Yb, Y, Sc, Ho, Er, etc.), $0<w<0.75$ (preferably $0.05\le w\le0.5$), D is a rare earth metal which is different from C (such as, e.g., Gd, La, Pr, Nd, Sm, Tb, Dy, Yb, Y, Sc, Ho, Er, etc.), $0\le z<0.75$ (preferably $0.05\le z\le0.5$), and $\delta$ is an oxygent stoichiometry value dependent on the amount of w+z, $0\le\delta<0.5$ (preferably $0\le\delta\le0.3$). The cathode current collector 22 may be formed of a conductive oxide material which is chemically compatible with a nickelate composite cathode, such as, e.g., LNF and LSM, etc., such that no chemical reaction occurs when the two materials contact each other and there is no third phase formation.

In another example, cathode 24 is formed of a composite nickelate having the general formula $(Ln_uM1_vM2_s)_{n+1}(Ni_{1-t}N_t)_nO_{3n+1}$-$A_{1-x}B_xO_y$, where Ln is a rare earth metal except for La (such as, e.g., Pr, Nd, Sm, etc.), $0<u\le1$ (preferably $0.25\le u\le0.75$), M1 is a rare earth metal which is both different from Ln and exclusive of La (such as, e.g., Pr, Nd, Sm, Gd, Tb, Dy, Yb, Y, Ho, Er, etc.), $0\le v<1$ (preferably $0.25\le v\le0.75$), M2 is an alkaline earth metal (such as, e.g., Sr, Ca, Ba, etc.), $0<s<0.3$ (preferably $0.02\le s\le0.15$), $0.9\le u+v+s<1.1$ (preferably $0.95\le u+v+s\le1.05$), preferably one of Ln and M1 is Pr and M2 is Sr, N is one or more transitions metals (such as, e.g., Mn, Fe, Cu, Ti, Cr, Co, V, Zn, etc.), $0\le t\le0.5$ (preferably $0.02\le t\le0.3$), $1<n$ (preferably $1\le n\le3$), preferably N is Cu, A is a rare earth metal except for Ce (such as, e.g., La, Pr, Nd, Gd, Sm, Tb, Dy, Yb, Y, Ho, Er, etc.), B is a rare earth metal which is both different from A and exclusive of Ce (such as, e.g., Gd, La, Pr, Nd, Sm, Tb, Dy, Yb, Y, Ho, Er, etc.), $0\le x<1$ (preferably $0.25\le x\le0.75$), $1.5\le y\le2.0$ (preferably $1.8\le y\le2.0$) and preferably one of A and B is Pr. Cathode barrier layer 26 is formed of a composition having the general formula $C_wD_zCe_{(1-w-z)}O_{2-\delta}$, where C is rare earth metal (such as, e.g., La, Pr, Nd, Gd, Sm, Tb, Dy, Yb, Y, Sc, Ho, Er, etc.), $0<w<0.75$ (preferably $0.05 \leq w \leq 0.5$), D is a rare earth metal which is different from C (such as, e.g., Gd, La, Pr, Nd, Sm, Tb, Dy, Yb, Y, Sc, Ho, Er, etc.), $0 \leq z < 0.75$ (preferably $0.05 \leq z \leq 0.5$), and $\delta$ is an oxygen stoichiometry value dependent on the amount of w+z, $0 \leq \delta < 0.5$ (preferably $0 \leq \delta \leq 0.3$). The cathode current collector 22 may be formed of a conductive oxide material which is chemically compatible with a nickelate composite cathode, such as, e.g., LNF and LSM, etc., such that no chemical reaction occurs when the two materials contact each other and there is no third phase formation.

In another example, cathode 24 is formed of a composite nickelate having the general formula $(Ln_uM1_vM2_s)_{n+1}(Ni_{1-t}N_t)_nO_{3n+1}\text{-}A_{1-x}B_xO_y\text{---}C_wD_zCe_{(1-w-z)}O_{2-\delta}$, where Ln is a rare earth metal (such as, e.g., La, Pr, Nd, Sm, etc.), $0 < u \leq 1$ (preferably $0.25 \leq u \leq 0.75$), M1 is a rare earth metal different from Ln (such as, e.g., La, Pr, Nd, Sm, Gd, Tb, Dy, Yb, Y, Ho, Er, etc.), $0 \leq v < 1$ (preferably $0.25 \leq v \leq 0.75$), M2 is an alkaline earth metal (such as, e.g., Sr, Ca, Ba, etc.), $0 < s < 0.3$ (preferably $0.02 \leq s \leq 0.15$), $0.9 \leq u+v+s < 1.1$ (preferably $0.95 \leq u+v+s \leq 1.05$), preferably one of Ln and M1 is Pr and M2 is Sr, N is one or more transitions metals (such as, e.g., Mn, Fe, Cu, Ti, Cr, Co, V, Zn, etc.), $0 \leq t \leq 0.5$ (preferably $0.02 \leq t \leq 0.3$), $1 \leq n$ (preferably $1 \leq n \leq 3$), preferably N is Cu, A is a rare earth metal except for Ce (such as, e.g., La, Pr, Nd, Gd, Sm, Tb, Dy, Yb, Y, Ho, Er, etc.), B is a rare earth metal which is both different from A and exclusive of Ce (such as, e.g., Gd, La, Pr, Nd, Sm, Tb, Dy, Yb, Y, Ho, Er, etc.), $0 \leq x < 1$ (preferably $0.25 \leq x \leq 0.75$), $1.5 \leq y \leq 2.0$ (preferably $1.8 \leq y \leq 2.0$) and preferably one of A and B is Pr, C is rare earth metal (such as, e.g., La, Pr, Nd, Gd, Sm, Tb, Dy, Yb, Y, Sc, Ho, Er, etc.), $0 < w < 0.75$ (preferably $0.05 \leq w \leq 0.5$), D is a rare earth metal which is different from C (such as, e.g., Gd, La, Pr, Nd, Sm, Tb, Dy, Yb, Y, Sc, Ho, Er, etc.), $0 \leq z < 0.75$ (preferably $0.05 \leq z \leq 0.5$), and $\delta$ is an oxygen stoichiometry dependent on the amount of w+z, $0 \leq \delta < 0.5$ (preferably $0 \leq \delta \leq 0.3$), and preferably one of C and D is Pr. Cathode barrier layer 26 is formed of a composition having the general formula $C_wD_zCe_{(1-w-z)}O_{2-\delta}$, where C is rare earth metal (such as, e.g., La, Pr, Nd, Gd, Sm, Tb, Dy, Yb, Y, Sc, Ho, Er, etc.), $0 < w < 0.75$ (preferably $0.05 \leq w \leq 0.5$), D is a rare earth metal which is different from C (such as, e.g., Gd, La, Pr, Nd, Sm, Tb, Dy, Yb, Y, Sc, Ho, Er, etc.), $0 \leq z < 0.75$ (preferably $0.05 \leq z \leq 0.5$), and $\delta$ is an oxygen stoichiometry value dependent on the amount of w+z, $0 \leq \delta < 0.5$ (preferably $0 \leq \delta \leq 0.3$). The cathode current collector 22 may be formed of a conductive oxide material which is chemically compatible with a nickelate composite cathode, such as, e.g., LNF and LSM, etc., such that no chemical reaction occurs when the two materials contact each other and there is no third phase formation.

EXAMPLES

Various experiments were carried out to evaluate one or more aspects of example cathode compositions and fuel cells employing such cathode compositions in accordance with the disclosure. However, examples of the disclosure are not limited to the experimental anode compositions.

In one instance, nickelate pellets formed of a material having the formula $(Pr_{0.5}Nd_{0.5})_2NiO_4$ were fabricated and then aged for about 500 hours at approximately 870 degrees C. FIG. 3A illustrates XRD patterns of the nickelate pellets as-fabricated. FIG. 3B illustrates XRD patterns of the nickelate pellets after aging. As shown, $PrO_x$ oxide that had exsoluted from the nickelate was identified after aging. $PrO_x$ is an undesired third phase since it may change cathode microstructure to reduce triple phase boundary and cause cathode detachment in local area resulted from higher thermal stress due to CTE mismatch. Additionally, a small NiO peak was identified.

In another instance, nickelate composite pellets formed of a material having the formula $(Pr_{0.5}Nd_{0.5})_2NiO_4$-15% GDC10 were fabricated and then aged for about 500 hours at approximately 870 degrees C. FIG. 4A illustrates XRD patterns of the nickelate composite pellets as-fabricated. FIG. 4B illustrates XRD patterns of the nickelate composite pellets after aging. As shown, $PrO_x$ oxide was not formed in the aged nickelate composite since exsoluted Pr was diffused in GDC phase. However, a small NiO peak was identified after aging. Even though both $PrO_x$ and NiO may be undesired phases, $(Pr_{0.5}Nd_{0.5})_2NiO_4$-15% GDC10 composite cathode showed much improved phase constitution after 500 hours of aging compared to $(Pr_{0.5}Nd_{0.5})_2NiO_4$ cathode due to significant reduction of undesired phase.

In another instance, nickelate composite pellets formed of a material having the formula $(Pr_{0.5}Nd_{0.5})_2NiO_4$-15% $(Pr_{0.24}Nd_{0.21})Ce_{0.55}O_2$ were fabricated and then aged for about 500 hours at approximately 870 degrees C. FIG. 5A illustrates XRD patterns of the nickelate composite pellets as-fabricated. FIG. 5B illustrates XRD patterns of the nickelate composite pellets after aging. As shown, third phase for both $PrO_x$ and NiO was not identified in the material. Additionally, for the example composite cathode material, less material migration occurred during firing and aging. The identified phases were higher order nickelate (e.g., n=3) and doped ceria, $(Pr,Nd,Ce)O_x$. In this example, $(Pr_{0.5}Nd_{0.5})_2NiO_4$-15% $(Pr_{0.24}Nd_{0.21})Ce_{0.55}O_2$, only higher order nickelate and doped ceria phases existed after 500 hours of aging at 870° C. showing further improved phase constitution compared to $(Pr_{0.5}Nd_{0.5})_2NiO_4$-15% GDC10 composite cathode since both phases are desired phase. As described before, nickelates have different phases, n=1 (lower order phase), 2, and 3 (higher order phase). All are desired phases.

In another instance, nickelate composite pellets having the formula PNN5050-30 wt % $(PrNd)O_y$ were fabricated and then aged for about 500 hours at approximately 870 degrees C. FIG. 6A illustrates the XRD patterns of the nickelate composite pellets as-fabricated. As shown, $PrO_x$ oxide appeared in FIG. 6A due to the addition of the $PrO_x$ phase. FIG. 6B illustrates the XRD patterns of the nickelate composite pellets after aging. As shown, the PrOx peak increased slightly and no NiO was identified in the material.

In another instance, nickelate composite pellets having the formula PNN5050-30 wt % $(PrNd)O_y$ were fabricated and then aged for about 500 hours at approximately 870 degrees C. FIG. 6A illustrates the XRD patterns of the nickelate composite pellets as-fabricated. As shown, $PrO_x$ oxide appeared in FIG. 6A due to the addition of the $PrO_x$ phase. FIG. 6B illustrates the XRD patterns of the nickelate composite pellets after aging. As shown, the $PrO_x$ peak increased slightly and no NiO was identified in the material.

In another instance, nickelate composite pellets having the formula PNN5050-30 wt % $(PrNd)O_y$ were fabricated and then aged for about 500 hours at approximately 870 degrees C. FIG. 6A illustrates the XRD patterns of the nickelate composite pellets as-fabricated. As shown, $PrO_x$ oxide appeared in FIG. 6A due to the addition of the $PrO_x$ phase. FIG. 6B illustrates the XRD patterns of the nickelate composite pellets after aging. As shown, the $PrO_x$ peak increased slightly and no NiO was identified in the material.

Figures 7A, 7B:
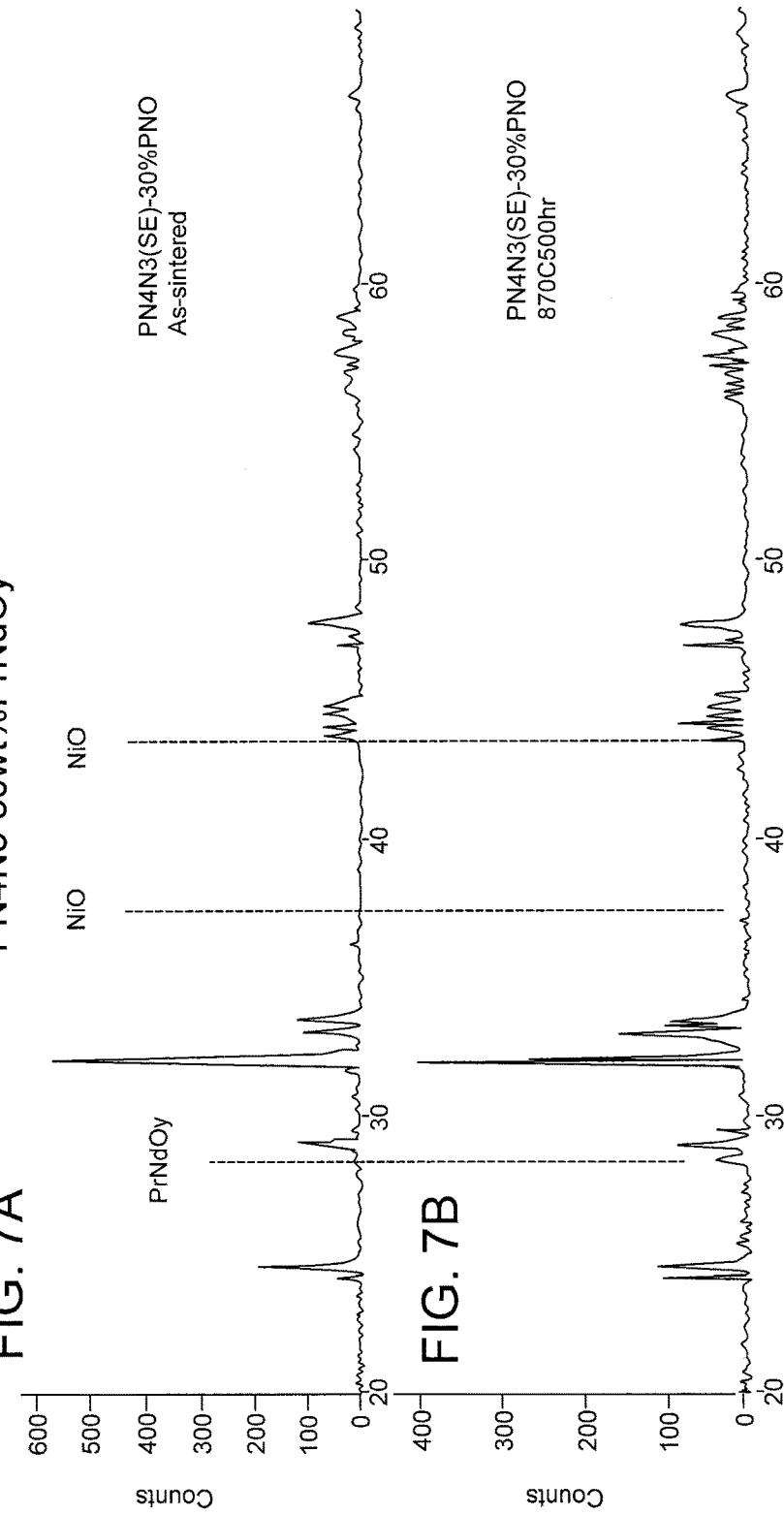
FIGS. 7A and 7B are plots illustrating XRD results for another example nickelate composite cathode composition before and after aging, respectively.

In another instance, nickelate composite pellets having the formula $(Pr_{0.48},Nd_{0.52})_4Ni_3O_{10}$ ("PN4N3")-30 wt % $(PrNd)O_y$ were fabricated and then aged for about 500 hours at approximately 870 degrees C. FIG. 7A illustrates the XRD patterns of the nickelate composite pellets as-fabricated. FIG. 7B illustrates the XRD patterns of the nickelate composite pellets after aging. As shown, no NiO peak or undesired phase was identified after aging Additionally, for this cathode composition less material migration occurred during firing and aging of the nickelate composite pellets.

In another instance, nickelate composite pellets having the formula PNN5050-15 wt % $Pr_6O_{11}$-15 wt % $(Pr_{0.25}Nd_{0.21})Ce_{0.55}O_x$ were fabricated and then aged for about 500 hours at approximately 870 degrees C. FIG. 8A illustrates the XRD patterns of the nickelate composite pellets as-fabricated. FIG. 8B illustrates the XRD patterns of the nickelate composite pellets after aging. As shown, neither impurity phase, $PrO_x$ or NiO, was identified after aging. After aging, higher order nickelate (n=3), doped ceria, and (Pr,Nd)$O_y$ phases where identified.

Figure 9A:
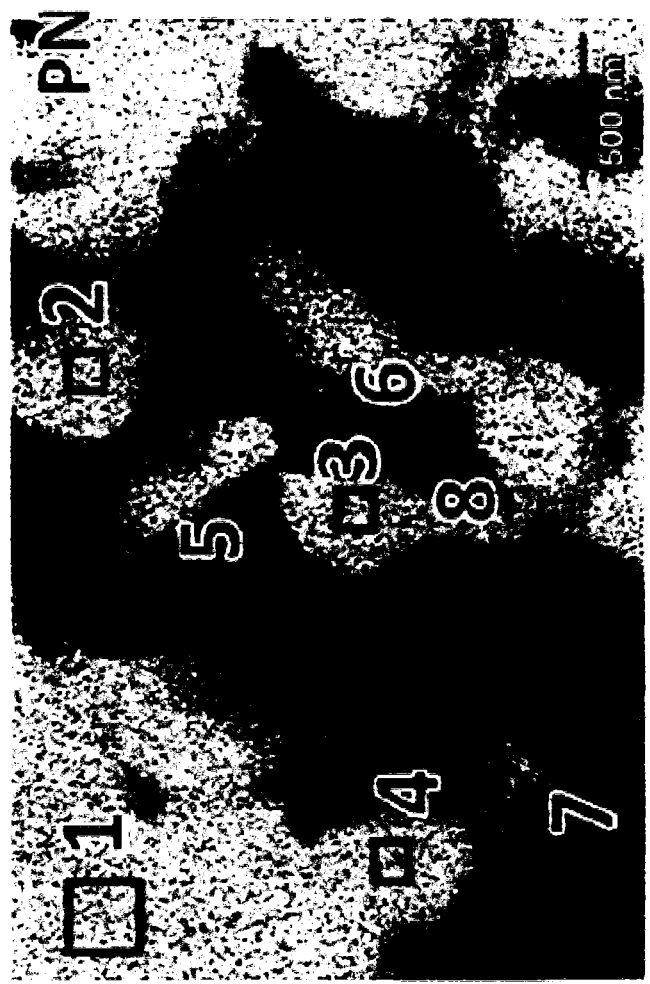
FIGS. 9A and 9B are transmission electron microscopy (TEM) images for two different example cathode compositions.

FIG. 9A is a transmission electron microscopy (TEM) image of the example $(Pr_{0.5}Nd_{0.5})_2NiO_4$ material described above after being aged for about 500 hours at approximately 870 degrees C. As shown in the image, (Pr,Nd)$O_x$ oxide was identified, e.g., at locations 5, 6, 7, and 8 in FIG. 6A.

Figure 9B:
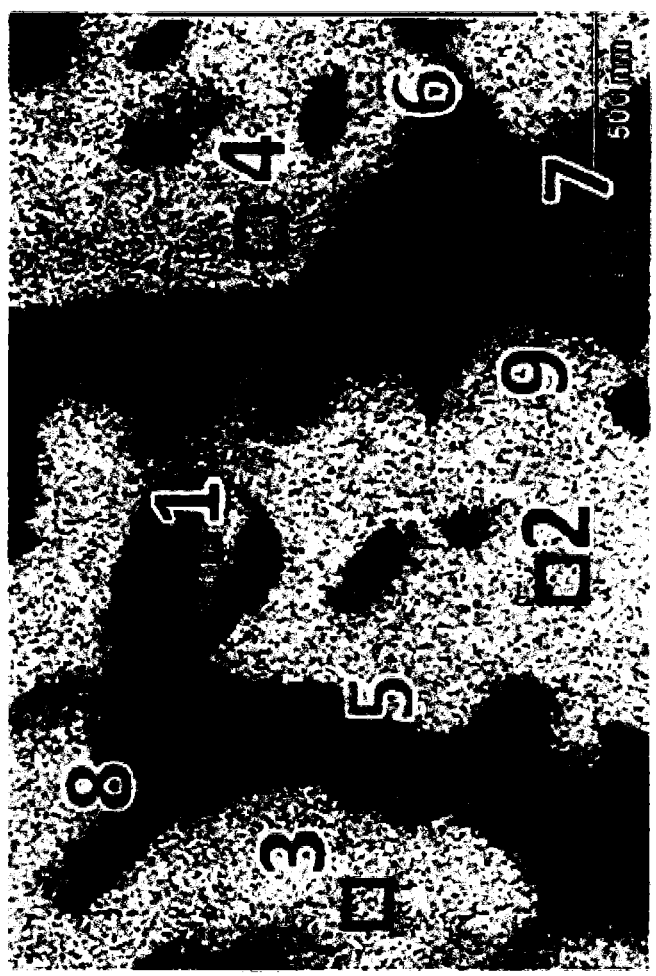

FIG. 9B is a TEM image of the example $(Pr_{0.5}Nd_{0.5})_2NiO_4$-15% GDC10 composite material described above after being aged for about 500 hours at approximately 870 degrees C. As shown in the image, Pr and Nd diffused into GDC and formed (Pr,Nd,Gd)$CeO_2$ solid solution, e.g., at locations 5, 6, and 7 in FIG. 6B. The Pr and Nd in the solid solution was determined to be as high as about 29% and about 20%, respectively. Further, NiO was identified, e.g., as location 1 in FIG. 6B.

The TEM analysis of nickelate or nickelate composite cathode confirmed our hypothesis about rare earth metal exsolution from nickelate and its dissolution into second ionic phase, doped ceria. The phase constitution in cathode was able to be managed through selection of rare earth metal as dopant for ceria and doping level, as well as the addition level of doped ceria in composite cathode.

Figure 10A:
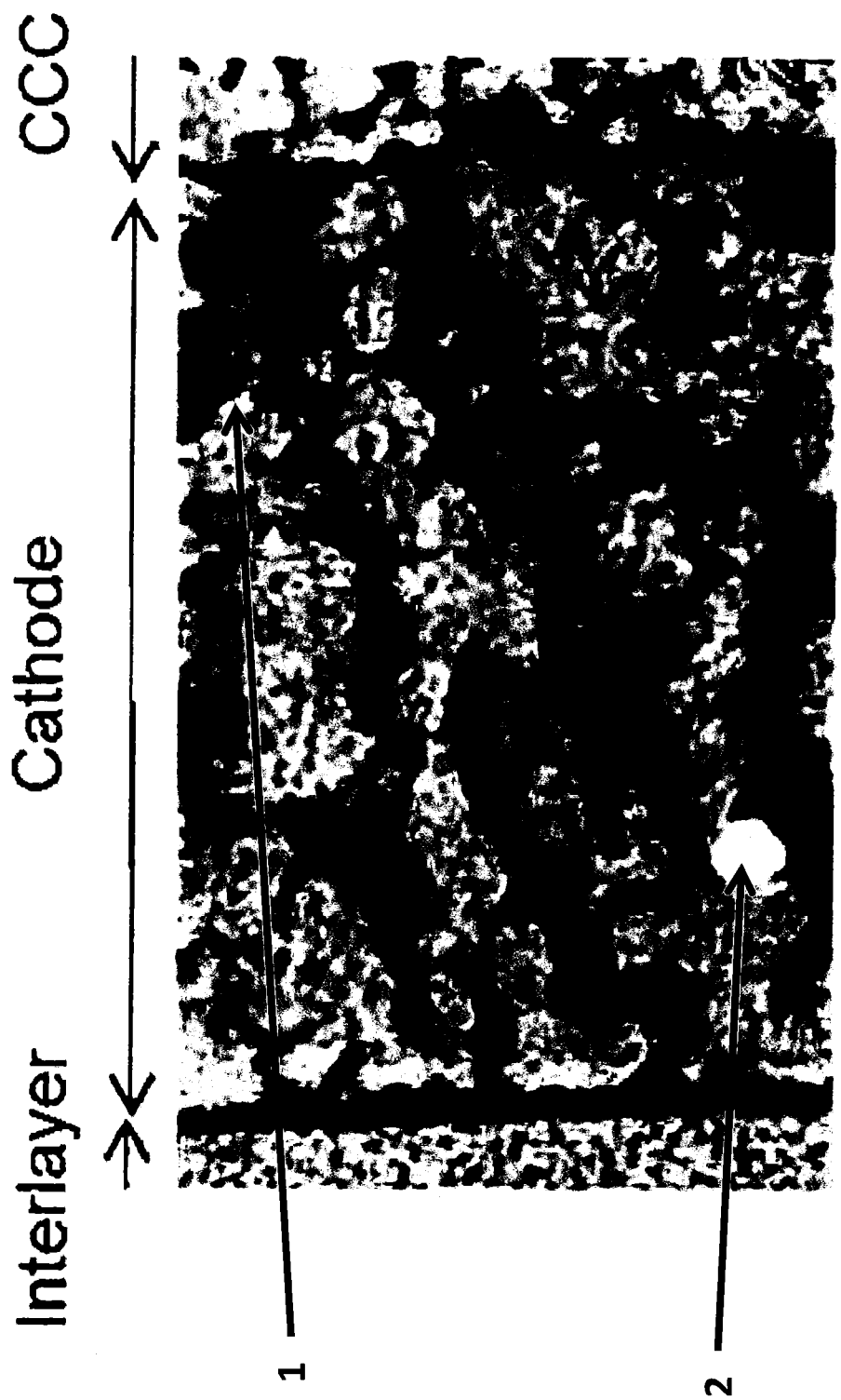
FIGS. 10A to 10C are additional transmission electron microscopy (TEM) images for example cathode compositions.
Figure 10B:
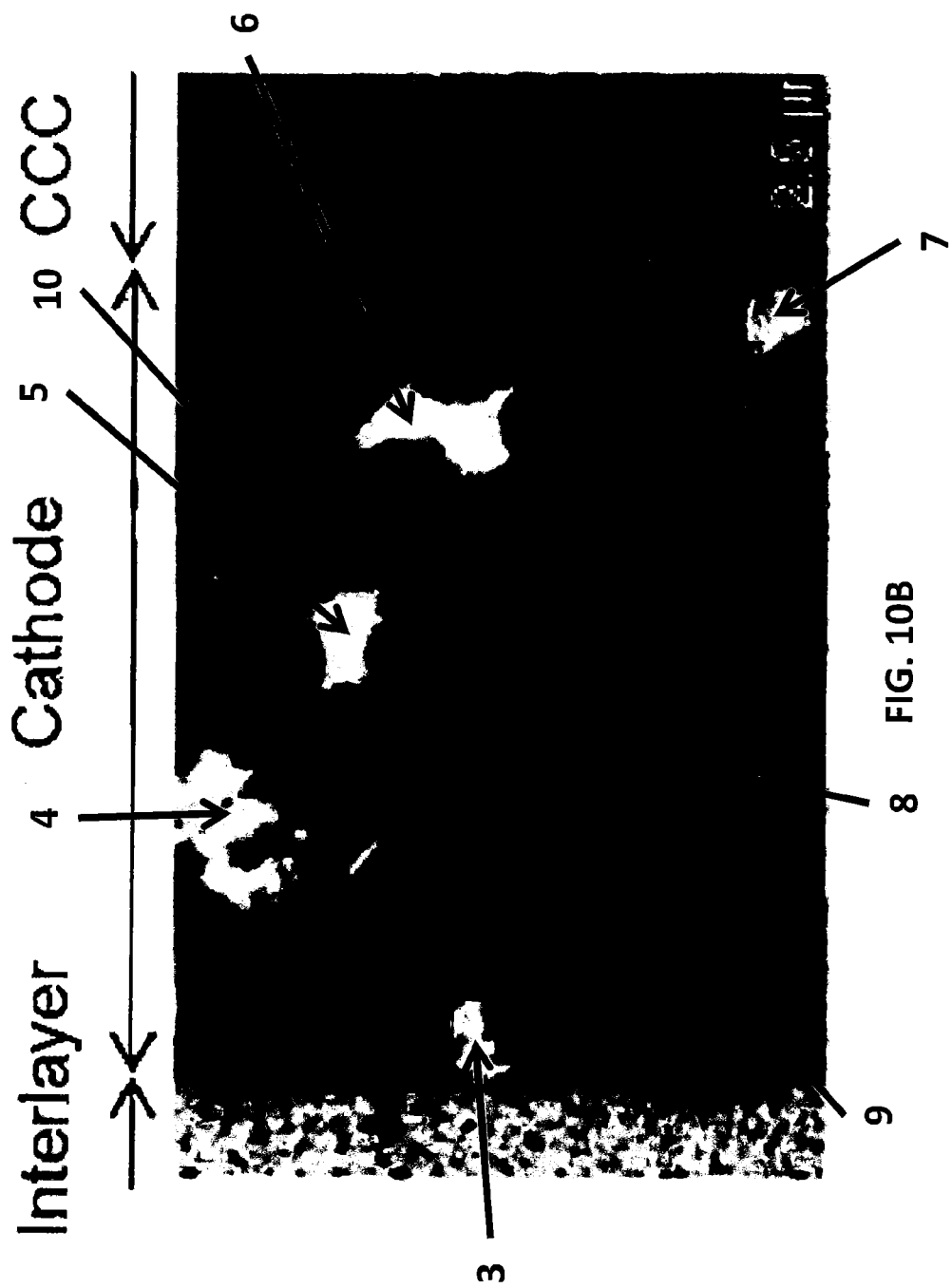
Figure 10C:
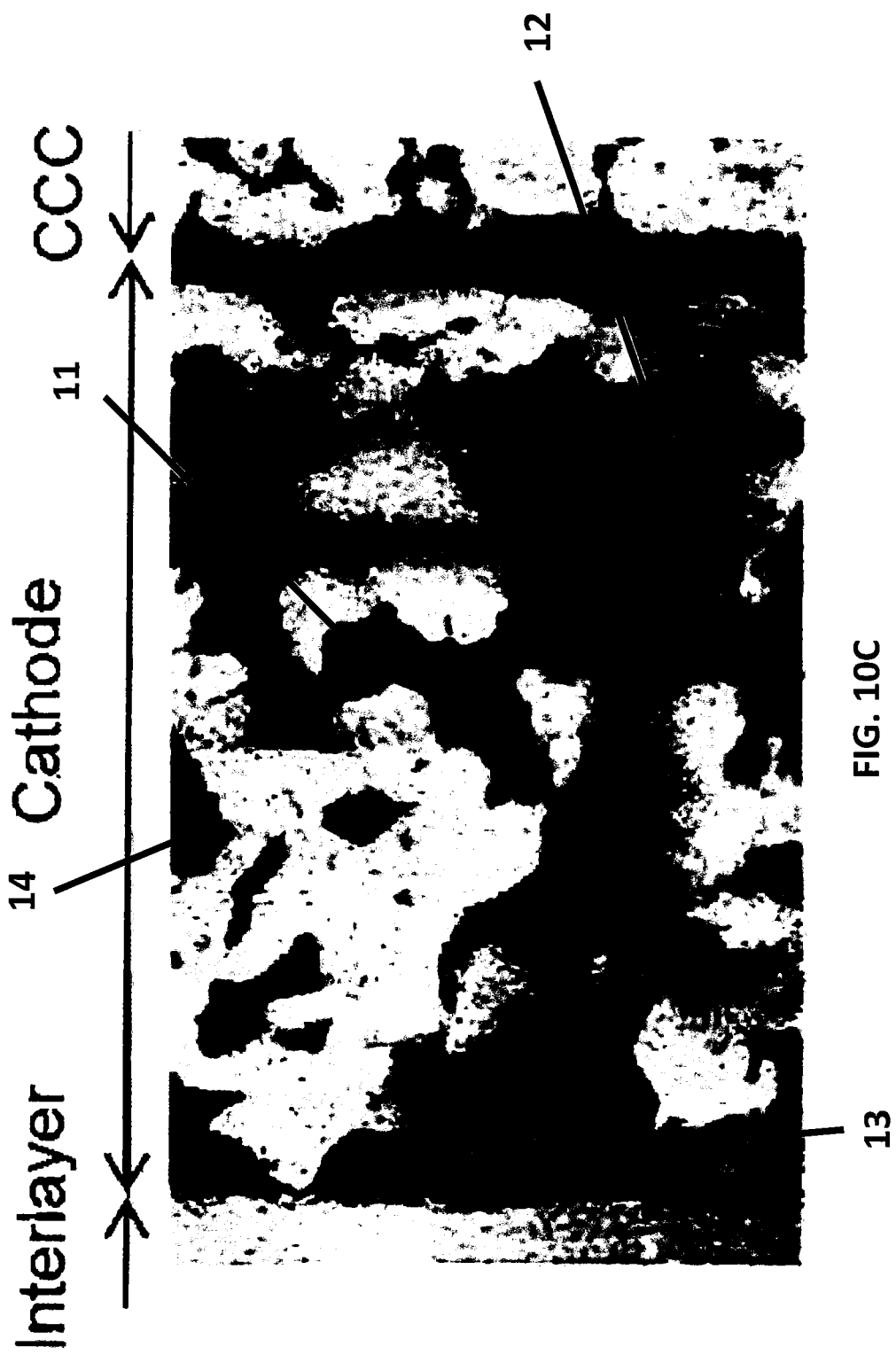

In another example, FIG. 10A is a TEM image of a PNN5050 cathode material as fabricated. FIG. 10B is a TEM image of a PNN5050 cathode material after cell operation for about 4000 hours and around 790 degrees C. FIG. 10C is a TEM image of PNN5050 cathode material after cell operation for about 2400 hours and about 870 degrees C. A NiO phase can been seen at locations 1 to 7 and a $PrO_x$ phase at locations 8 to 14, representing a phase separation or decomposition. Additionally, the PNN5050 cathode material has a coarser microstructure after operation than the microstructure of the as-fabricated PNN5050 cathode.

Figure 11A:
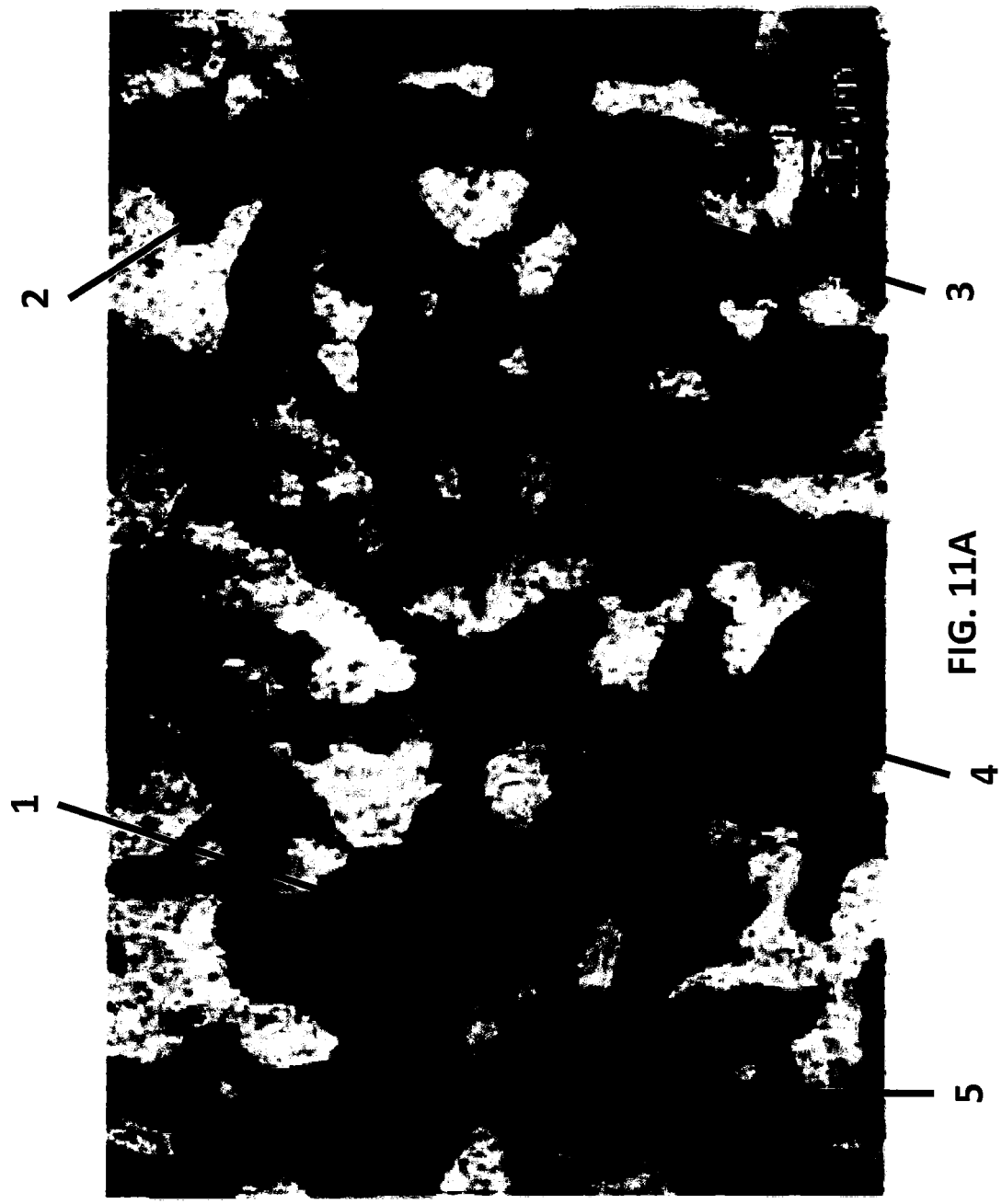
FIGS. 11A and 11B are additional transmission electron microscopy (TEM) images for two different example cathode compositions.

FIG. 11A is a TEM image of the example PNN5050-30 wt % (PrNd)$O_y$ composite material described above after being aged for about 500 hours at approximately 870 degrees C. As shown in the image, a NiO phase was not identified, a result which agrees with the XRD results. Additionally, Pr and Nd have exsoluted from the nickelate leading to the formation of (Pr,Nd)$O_y$ seen at locations 1 to 5. This indicates that the PNN5050 phase may be changed into a higher order nickelate composition.

Figure 11B:

FIG. 11B is a TEM image of the example PN4N3-30 wt % (PrNd)$O_y$ composite material described above after being aged for about 500 hours at approximately 870 degrees C. As shown in the image, a NiO phase was not identified, a result which agrees with the XRD results. Additionally, the post-again TEM image indicates that the phases of the example are the same as those originally mixed.

Figure 12A:
FIGS. 12A and 12B are scanning electron microscopy (SEM) images for two different example cathode compositions.
Figure 12B:
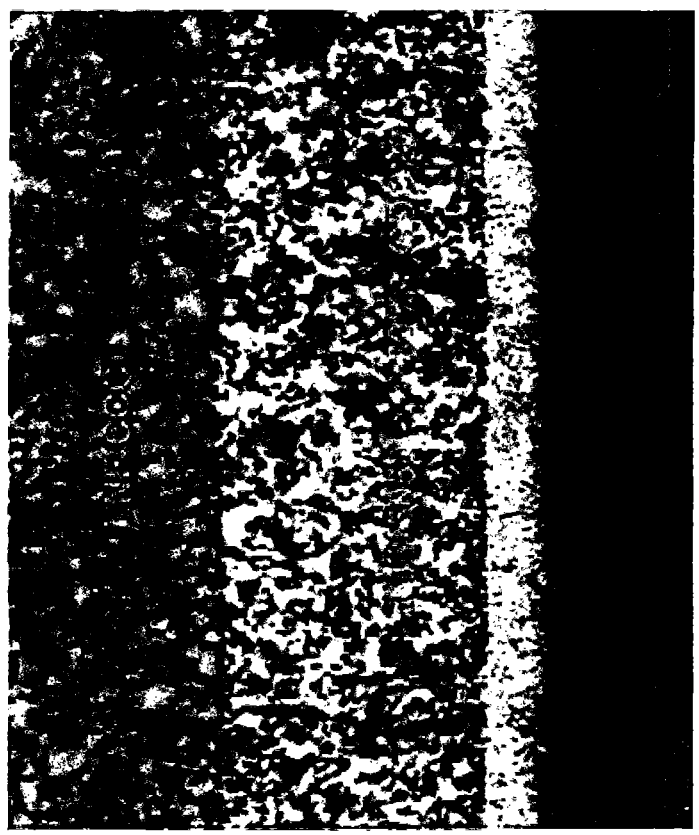

FIGS. 12A and 12B are a scanning electron microscopy (SEM) images of two example electrochemical cell structures (cathode symmetrical cell), after 150 hrs of operation at 870° C., 14% $O_2$-3% $H_2O$, and 300 mA/cm$^2$, including an LNF CCC layer, a nickelate cathode layer, and a GDC10 cathode barrier layer in the configuration shown in FIG. 2 after aging. In the example of FIG. 12A, the cathode was formed of a composition with the formula $(Pr_{0.5}Nd_{0.5})_2NiO_4$ without any GDC. Conversely, in the example of FIG. 12B, the cathode was formed of a composition with the formula $(Pr_{0.5}Nd_{0.5})_2NiO_4$-30% GDC20. As shown, the example cathode of FIG. 12B displayed fine microstructure and better adhesion to the cathode barrier layer as compared to the example cathode of FIG. 12A.

Figure 13:
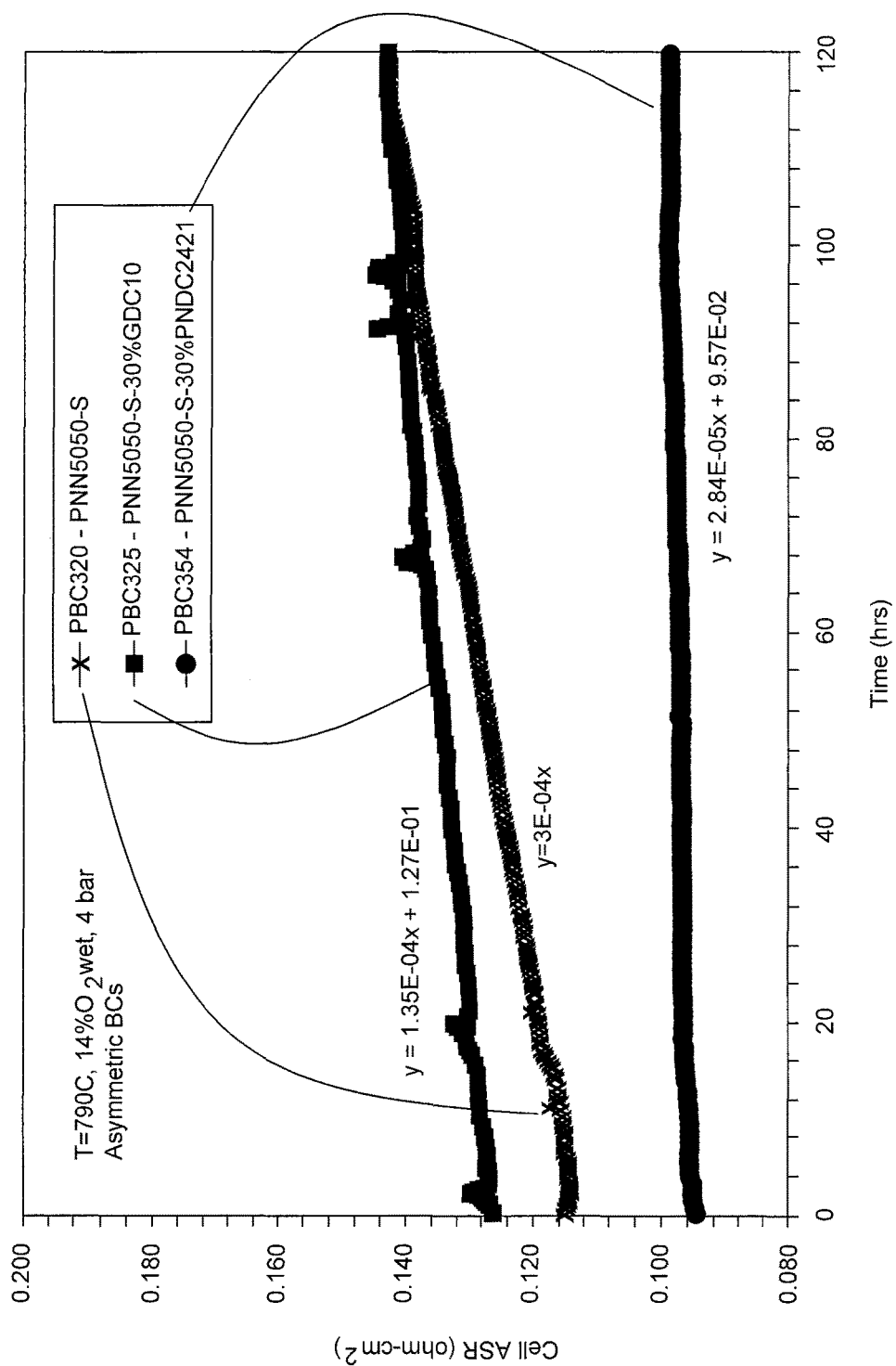
FIG. 13 is a plot illustrating the results of a short-term durability test of example cathode asymmetric button cells.

FIG. 13 is a plot illustrating the results of a short-term durability test of cathode asymmetric button cells (anodic side has the same material) with different example cathodes: 1) $(Pr_{0.5}Nd_{0.5})_2NiO_4$ ("PNN5050"); 2) $(Pr_{0.5}Nd_{0.5})_2NiO_4$-30 wt % GDC10 ("PNN5050-30% GDC10"); and 3) $(Pr_{0.5}Nd_{0.5})_2NiO_4$-15% $(Pr_{0.24}Nd_{0.21})Ce_{0.55}O_2$ ("PNN5050-30% PNDC2421"). In this plot, cell ASR is defined as $(ASR_{anodic}+ASR_{cathodic}+ASR_{ele})/2$. These button cells included of GDC10 as a cathode barrier layer and LNF as a cathode current collector. As shown in the plot, it can be seen that the cell degradation rate was decreased from about 0.3 ohm-cm$^2$/1000 hrs for the PNN5050 nickelate cathode to about 0.1 ohm-cm$^2$/1000 hrs for PNN5050-30% GDC10, and then about 0.03 ohm-cm$^2$/1000 hrs for PNN5050-30% PNDC2421, which also had lower ASR. As discussed in previous paragraphs, when the cathode composition was changed from $(Pr_{0.5}Nd_{0.5})_2NiO_4$ ("PNN5050") to $(Pr_{0.5}Nd_{0.5})_2NiO_4$-ionic composite cathode, the undesired third phase was significantly decreased (compare FIG. 3B and FIG. 4B). When the cathode composition was changed from $(Pr_{0.5}Nd_{0.5})_2NiO_4$-GDC10 to $(Pr_{0.5}Nd_{0.5})_2NiO_4$-15% $(Pr_{0.24}Nd_{0.21})Ce_{0.55}O_2$ composite phase, the phase constitution was further improved after aging and the third undesired phase was eliminated.

Figure 14:
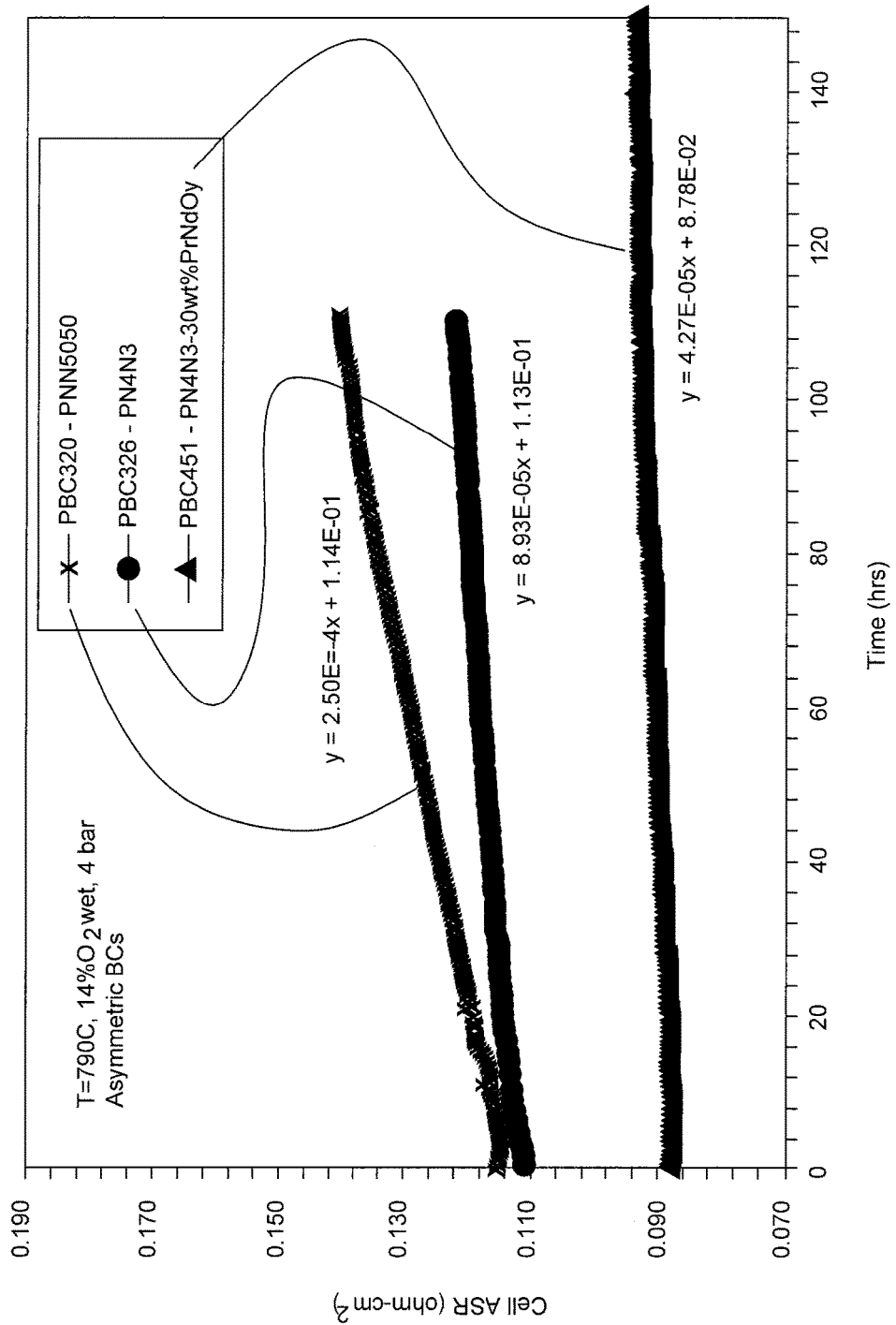
FIG. 14 is another plot illustrating the results of a short-term durability test of example cathode asymmetric button cells.

FIG. 14 is a plot illustrating the results of a short-term durability test of cathode asymmetric button cells with the following example cathodes: 1) $(Pr_{0.5}Nd_{0.5})_2NiO_4$ ("PNN5050"); 2) $(Pr_{0.48}Nd_{0.52})_4Ni_3O_{10}$ ("PN4N3"); and 3) PN4N3-30 wt % (PrNd)$O_y$. As shown in FIG. 14, the cell degradation rate was decreased from about 0.09 ohm-cm$^2$/1000 hours for the PN4N3 nickelate cathode to about 0.04 ohm-cm$^2$/1000 hours for PN4N3-30 wt % (PrNd)$O_y$. Both of these degradation rates compare favorably to PNN5050 which had a degradation rate of about 0.3 ohm-cm$^2$/1000 hrs. Additionally, PN4N3-30 wt % (PrNd)$O_y$ exhibited a lower ASR than PN4N3, and both the PN4N3 and the PN4N3-30 wt % (PrNd)$O_y$ cathodes had lower ASRs than PNN5050.

Figure 15:
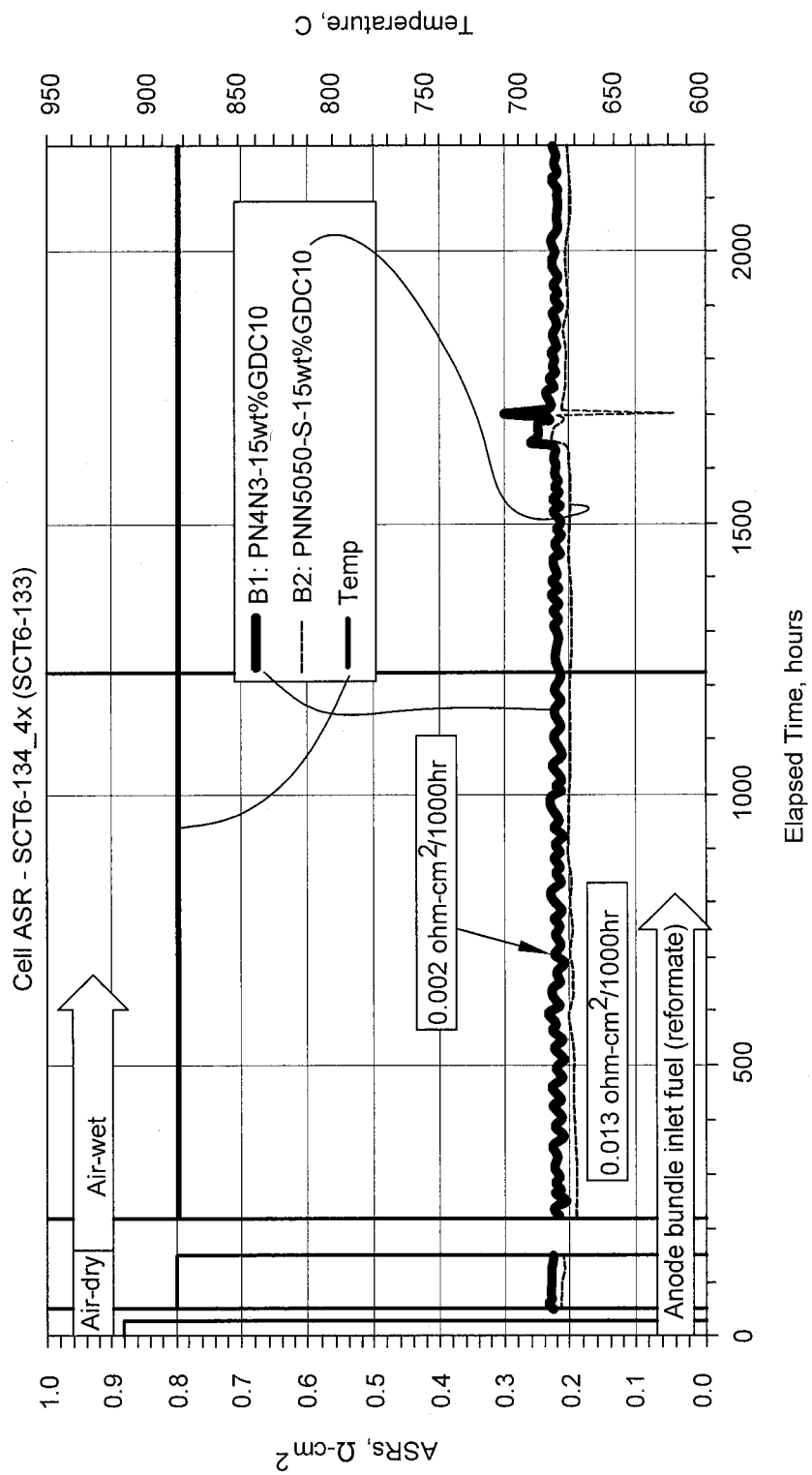
FIGS. 15 and 16 are plots of results from long term durability test carried out on example nickelate and/or nickelate composite cathodes.

FIG. 15 is a plot of results from a long term durability test of nickelate composite cathodes (($Pr_{0.5}Nd_{0.5})_4Ni_3O_{10}$ ($PN_4N_3$)-15 wt % GDC10 and PNN5050-15 wt % GDC10) using subscale cell with segment-in-series cell design (the active cell was printed on porous substrate) at about 880 degrees Celsius, wet air, and reformate fuel. After about 2,200 hours of operation, the cell ASR was about 0.2 ohm-cm$^2$, and degradation rate was about 0.002 ohm-cm$^2$/1000 hr for the ($PN_4N_3$)-15 wt % GDC10 cathode and about 0.013 ohm-cm$^2$/1000 hr for the PNN5050-15 wt % GDC10 cathode.

Figure 16:
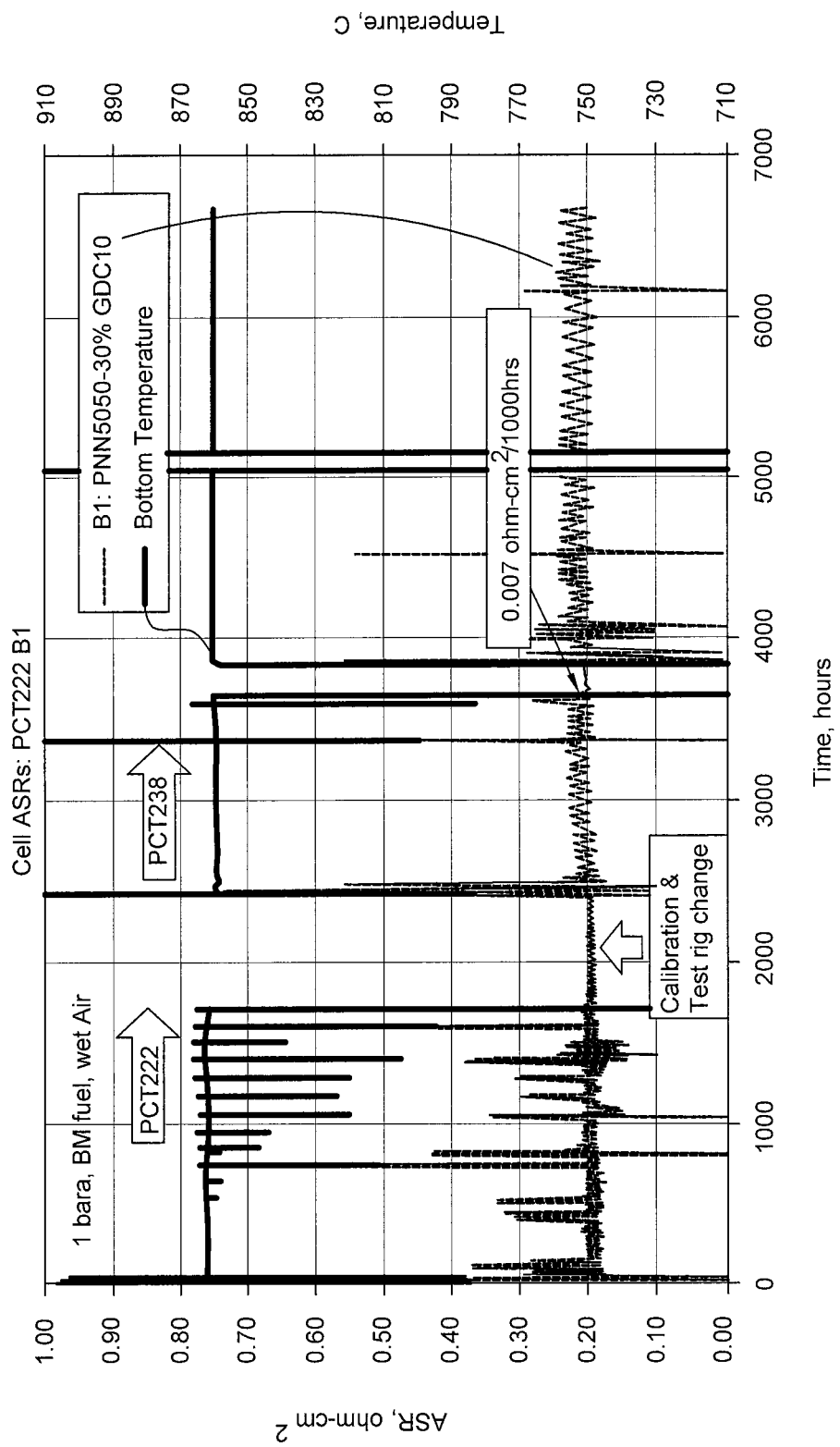

FIG. 16 is a plot of results from a long term durability test of nickelate composite cathode, PNN5050-30 wt % GDC10, using subscale cell with segment-in-series cell design (active cells were printed on porous substrate) at about 860 degrees Celsius, wet air, and reformate fuel. After about 6,600 hours of operation, the cell ASR was about 0.22 ohm-cm$^2$, and degradation rate was about 0.007 ohm-cm$^2$/1000 hr.

Figure 17:
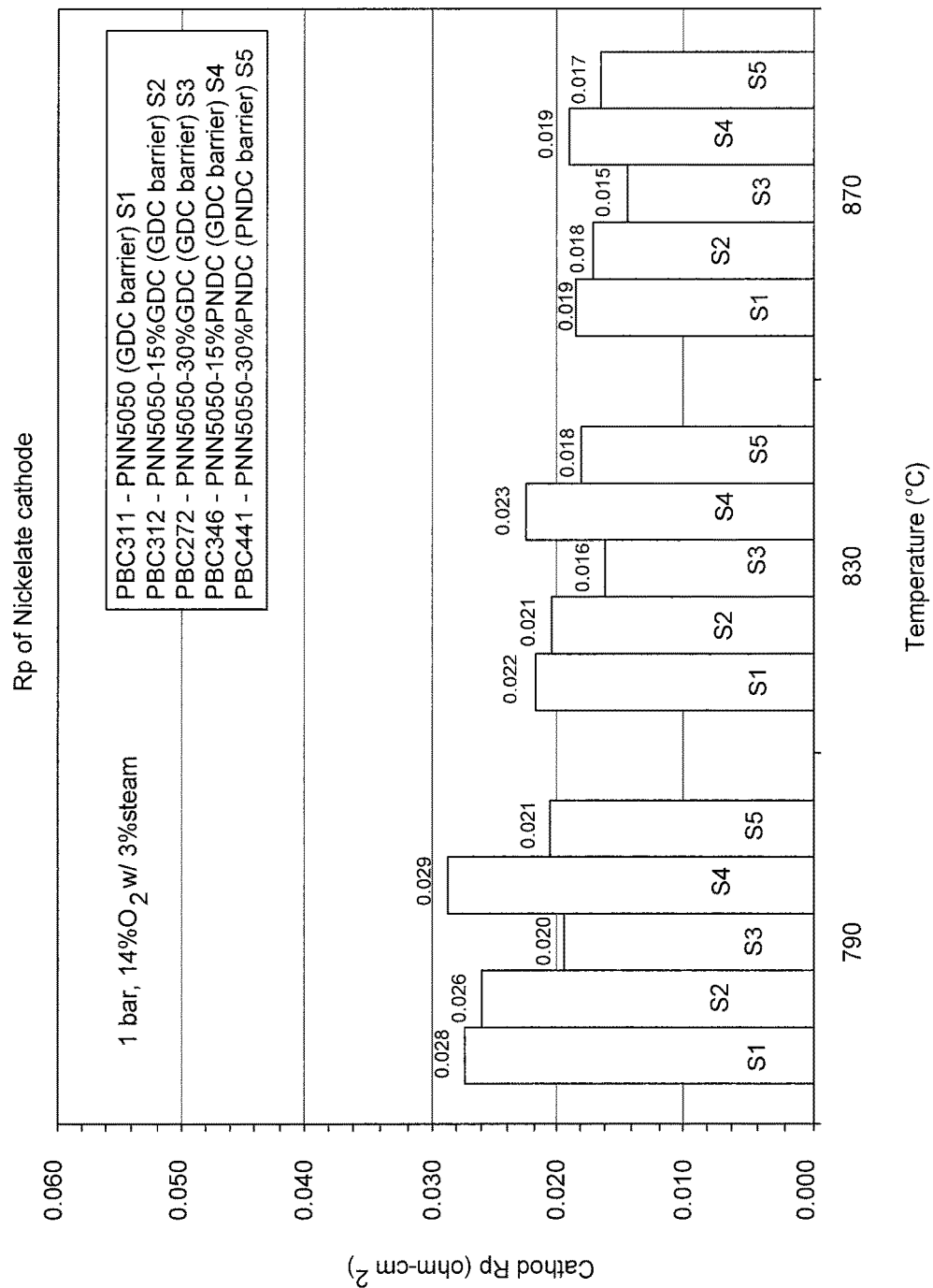
FIG. 17 is bar chart showing cathode polarization for various example nickelate composite cathodes.

FIG. 17 is bar chart showing cathode polarization (Rp) of various nickelate composite cathodes with cathode barrier layer tested under 14% $O_2$-3% steam and 1 bara using cathode symmetric button cells (for button cell, the electrolyte is thicker, about 100 micron vs 10 microns for segmented-in-series cell design). For some nickelate composite cathodes with 30 wt % ionic phase, polarization was about 0.02 ohm-cm$^2$ or lower at about 790 to about 870 degrees Celsius.

Figure 18:
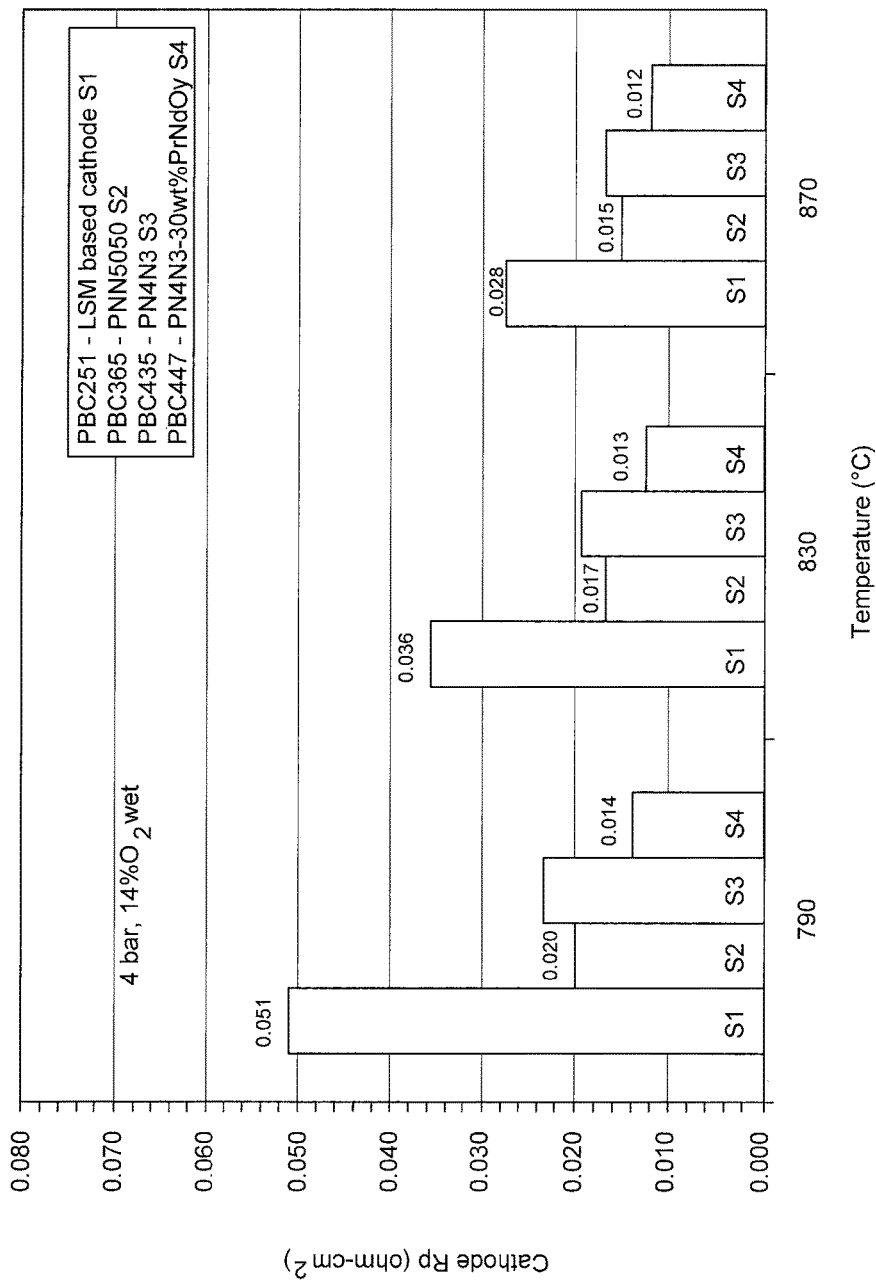
FIG. 18 is bar chart showing cathode polarization for various additional example nickelate composite cathodes.

FIG. 18 is bar chart showing cathode polarization (Rp) of various nickelate composite cathodes with cathode barrier layer tested under 14% $O_2$, 3% steam conditions, and 4 bar using cathode symmetric button cells. For some nickelate composite cathodes with 30 wt % second oxide phase, polarization was about 0.014 ohm-cm$^2$ or lower at about 790 to about 870 degrees Celsius. In addition to the lower ASR, the PN4N3-30 wt % PrNdOy composition showed lower activation energy than the other example cathode materials.

Various embodiments of the disclosure have been described. These and other embodiments are within the scope of the following claims.

We claim:

1. A method of inhibiting the formation of a lanthanide oxide phase in a fuel cell having a cathode comprising a lanthanide nickelate, said method comprising:
forming the cathode from a composition comprising a lanthanide nickelate and a second oxide material which adsorbs an oxide formed from the lanthanide,
wherein said lanthanide nickelate comprises 50-70% of the cathode by weight, and
wherein the composition has a general formula of:

$$(Ln_uM1_vM2_s)_{n+1}(Ni_{1-t})_nO_{3n+1}\text{-}A_{1-x}B_xO_y\text{-}C_wD_zCe_{(1-w-z)}O_{2-\delta},$$

where Ln is a rare earth metal, $0<u\le 1$, M1 is a rare earth metal different from Ln, $0\le v<1$, M2 is an alkaline earth metal, $0\le s<0.3$, $0.9\le u+v+s<1.1$, N is one or more transitions metals, $0\le t\le 0.5$, $1\le n\le 3$, A is a rare earth metal except for Ce, B is a rare earth metal which is both different from A and exclusive of Ce, $0<x<1$, $1.5\le y\le 2.0$, C is rare earth metal, $0<w<0.75$, D is a rare earth metal which is different from C, $0<z<0.75$, and $0\le\delta<0.5$.

2. The method of claim 1 wherein the lanthanide nickelate comprises praseodymium.

3. The method of claim 1 wherein the second oxide material conducts ions.

4. The method of claim 1 wherein one or element A or element B is praseodymium.

5. The method of claim 1 wherein one of element C or element D is praseodymium.

* * * * *